US011818763B2

(12) United States Patent
Ahn et al.

(10) Patent No.: US 11,818,763 B2
(45) Date of Patent: *Nov. 14, 2023

(54) WIRELESS COMMUNICATION TERMINAL FOR MULTI-USER UPLINK TRANSMISSION, AND WIRELESS COMMUNICATION METHOD

(71) Applicants: WILUS INSTITUTE OF STANDARDS AND TECHNOLOGY INC., Gyeonggi-do (KR); SK TELECOM CO., LTD., Seoul (KR)

(72) Inventors: Woojin Ahn, Seoul (KR); Yongho Kim, Incheon (KR); Jinsam Kwak, Gyeonggi-do (KR); Juhyung Son, Gyeonggi-do (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/412,219

(22) Filed: Aug. 25, 2021

(65) Prior Publication Data
US 2021/0385876 A1    Dec. 9, 2021

Related U.S. Application Data

(63) Continuation of application No. 16/595,405, filed on Oct. 7, 2019, now Pat. No. 11,140,718, which is a
(Continued)

(30) Foreign Application Priority Data

Feb. 13, 2015 (KR) .................. 10-2015-0022343
Jun. 16, 2015 (KR) .................. 10-2015-0085453
Jul. 17, 2015 (KR) .................. 10-2015-0101502

(51) Int. Cl.
H04W 74/08 (2009.01)
H04W 84/12 (2009.01)
(Continued)

(52) U.S. Cl.
CPC ... *H04W 74/0833* (2013.01); *H04W 28/0278* (2013.01); *H04W 52/0216* (2013.01);
(Continued)

(58) Field of Classification Search
CPC ......... H04W 28/0278; H04W 52/0216; H04W 52/0219; H04W 52/0229; H04W 72/04;
(Continued)

(56) References Cited

U.S. PATENT DOCUMENTS

2012/0188925 A1* 7/2012 Lee .................. H04W 52/0235
370/311
2014/0269317 A1* 9/2014 Wang .................. H04W 28/06
370/235
(Continued)

FOREIGN PATENT DOCUMENTS

KR   10-2009-0058744   6/2009
KR   10-2012-0072331   7/2012
(Continued)

OTHER PUBLICATIONS

International Search Report for PCT/KR2016/001515 dated Jun. 29, 2016 and its English translation from WIPO (published as WO 2016/129979).
(Continued)

*Primary Examiner* — Zhensheng Zhang
(74) *Attorney, Agent, or Firm* — Ladas & Parry, LLP

(57) ABSTRACT

The present invention relates to a wireless communication terminal and a wireless communication method for efficiently scheduling simultaneous uplink transmissions of a plurality of terminals.
(Continued)

To this end, provided are a wireless communication terminal, the terminal including: a transceiver; and a processor, wherein the processor receives, through the transceiver, a trigger frame transmitted by a base wireless communication terminal, and performs a multi-user uplink transmission based on the received trigger frame, wherein the trigger frame includes a predetermined field indicating whether an additional trigger frame is present or not, and a wireless communication method using the same.

12 Claims, 22 Drawing Sheets

Related U.S. Application Data continuation of application No. 15/676,985, filed on Aug. 14, 2017, now Pat. No. 10,477,589, which is a continuation of application No. PCT/KR2016/001515, filed on Feb. 15, 2016.

(51) Int. Cl.
*H04W 52/02* (2009.01)
*H04W 28/02* (2009.01)
*H04W 72/04* (2023.01)

(52) U.S. Cl.
CPC ... *H04W 52/0219* (2013.01); *H04W 52/0229* (2013.01); *H04W 72/04* (2013.01); *H04W 84/12* (2013.01); *Y02D 30/70* (2020.08)

(58) Field of Classification Search
CPC ... H04W 74/0833; H04W 84/12; Y02D 30/70
See application file for complete search history.

(56) References Cited

U.S. PATENT DOCUMENTS

2016/0227533 A1\* 8/2016 Josiam ................ H04W 74/006
2016/0227565 A1\* 8/2016 Ghosh .................. H04L 5/0055
2018/0014334 A1 1/2018 Ahn et al.

FOREIGN PATENT DOCUMENTS

| KR | 10-2014-0037892 | 3/2014 |
| KR | 10-2014-0148277 | 12/2014 |
| WO | 2013/157787 | 10/2013 |
| WO | 2016/129979 | 8/2016 |

OTHER PUBLICATIONS

Written Opinion of the International Searching Authority for PCT/KR2016/001515 dated Jun. 29, 2016 and its English translation from WIPO (published as WO 2016/129979).
International Preliminary Report on Patentability (Chapter I) for PCT/KR2016/001515 dated Aug. 15, 2017 and its English translation from WIPO (published as WO 2016/129979).
Notice of Allowance for U.S. Appl. No. 15/676,985 dated Jul. 8, 2019 (now published as US 2018/0014334).
Non-Final Office Action for U.S. Appl. No. 15/676,985 dated Feb. 8, 2019 (now published as US 2018/0014334).
Notice of Allowance for U.S. Appl. No. 16/595,405 dated May 25, 2021 (now published as US 2020/0068618).
Non-Final Office Action for U.S. Appl. No. 16/595,405 dated Feb. 5, 2021 (now published as US 2020/0068618).

\* cited by examiner

WIRELESS COMMUNICATION TERMINAL FOR MULTI-USER UPLINK TRANSMISSION, AND WIRELESS COMMUNICATION METHOD

CROSS-REFERENCE TO RELATED APPLICATIONS

This application is a continuation of U.S. patent application Ser. No. 16/595,405 filed on Oct. 7, 2019, which is a continuation of U.S. application Ser. No. 15/676,985 filed on Aug. 14, 2017, which is a continuation of International Patent Application No. PCT/KR2016/001515 filed on Feb. 15, 2016, which claims the priority to Korean Patent Application No. 10-2015-0022343 filed in the Korean Intellectual Property Office on Feb. 13, 2015, Korean Patent Application No. 10-2015-0085453 filed in the Korean Intellectual Property Office on Jun. 16, 2015, and Korean Patent Application No. 10-2015-0101502 filed in the Korean Intellectual Property Office on Jul. 17, 2015, the entire contents of which are incorporated herein by reference.

TECHNICAL FIELD

The present invention relates to a wireless communication terminal and a wireless communication method for multi-user uplink transmission, and more particularly, to a wireless communication terminal and a wireless communication method for efficiently scheduling simultaneous uplink transmissions of a plurality of terminals.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless LAN standards after the 802.11ac and 802.11ad, discussion for providing a high-efficiency and high-performance wireless LAN communication technology in a high-density environment is continuously performed. That is, in a next-generation wireless LAN environment, communication having high frequency efficiency needs to be provided indoors/outdoors under the presence of high-density stations and access points (APs) and various technologies for implementing the communication are required.

DISCLOSURE

Technical Problem

The present invention has an object to provide high-efficiency/high-performance wireless LAN communication in a high-density environment as described above.

In addition, the present invention has an object to reduce the possibility of collision of data transmission of a plurality of terminals in a dense user environment and to provide a stable data communication environment.

Also, the present invention has an object to provide a method by which a plurality of terminals can efficiently perform multi-user uplink transmission.

Technical Solution

In order to achieve the objects, the present invention provides a wireless communication method and a wireless communication terminal as below.

First, an exemplary embodiment of the present invention provides a wireless communication terminal, including: a transceiver; and a processor, wherein the processor receives, through the transceiver, a trigger frame transmitted by a base wireless communication terminal, and performs a multi-user uplink transmission based on the received trigger frame, wherein the trigger frame includes a predetermined field indicating whether an additional trigger frame is present or not In this case, the predetermined field indicates whether or not an additional trigger frame follows the received trigger frame within a predetermined period.

According to an embodiment, the processor determines a state of the terminal based on a value of the predetermined field when the received trigger frame does not indicate uplink transmission of the terminal.

In this case, the processor maintains an awake state of the terminal when the predetermined field indicates that an additional trigger frame is present, and the processor switches the terminal to a doze state when the predetermined field indicates that no additional trigger frame is present.

According to an embodiment, the processor receives, from the base wireless communication terminal, a contention trigger frame for a random access based multi-user uplink transmission, and performs a random access based multi-user uplink transmission based on the reception of the contention trigger frame.

In addition, the processor allocates a backoff counter for the random access, performs a backoff procedure based on the allocated backoff counter in response to the reception of the contention trigger frame, and performs the random access based multi-user uplink transmission when the backoff counter is decremented to 0.

In this case, the processor decrements the backoff counter by N in a contention process, and wherein the N is the number of resource unit(s) allocated for random access.

Furthermore, the contention trigger frame requests a buffer status report of at least one terminal, and the processor transmits, through the transceiver, buffer status information of the terminal on a random access basis in response to the reception of the contention trigger frame.

According to another embodiment, the processor receives, from the base wireless communication terminal, a contention trigger frame requesting a buffer status report of at least one terminal before receiving the trigger frame, and transmits buffer status information of the terminal to the base wireless communication terminal in response to the reception of the contention trigger frame when the terminal has uplink data to be transmitted.

In this case, the processor transmits buffer status information of the terminal on a random access basis.

In addition, the processor allocates a backoff counter in response to the reception of the contention trigger frame, performs a backoff procedure based on the allocated backoff counter, and transmits buffer status information of the terminal when the backoff counter of the backoff procedure expires.

Furthermore, the processor transmits buffer status information of the terminal along with uplink data of the terminal.

According to an embodiment, the buffer status information of the terminal includes at least one of identifier information of the terminal, size information of data to be transmitted by the terminal, and access category information of data to be transmitted by the terminal.

Next, an exemplary embodiment of the present invention provides a wireless communication method of a wireless communication terminal, the method including: receiving a trigger frame transmitted by a base wireless communication terminal; and performing a multi-user uplink data transmission based on the received trigger frame, wherein the trigger frame includes a predetermined field indicating whether an additional trigger frame is present or not.

Next, another exemplary embodiment of the present invention provides a base wireless communication terminal, the terminal including: a transceiver; and a processor, wherein the processor transmits a first trigger frame triggering a multi-user uplink transmission of a plurality of terminals, wherein a predetermined field of the first trigger frame indicates whether a second trigger frame follows first trigger frame.

In this case, the predetermined field is determined based on whether the corresponding trigger frame is the last trigger frame within a predetermined service period.

Advantageous Effects

According to an embodiment of the present invention, efficient multi-user uplink transmission scheduling is possible in a contention-based channel access system.

Also, according to the embodiment of the present invention, a consecutive transmission process for increasing efficiency of multi-user uplink transmission is provided.

Also, according to the embodiment of the present invention, it is possible to efficiently allocate resource units by deriving a buffer status report of each station.

Also, according to the embodiment of the present invention, it is possible to efficiently set NAVs for terminals not participating in the multi-user uplink/downlink transmission According to the embodiment of the present invention, it is possible to increase the total resource utilization rate in the contention-based channel access system and improve the performance of the wireless LAN system.

BEST MODE

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

This application claims priority to and the benefit of Korean Patent Application Nos. 10-2015-0022343, 10-2015-0085453 and 10-2015-0101502 filed in the Korean Intellectual Property Office and the embodiments and mentioned items described in the respective application, which forms the basis of the priority, shall be included in the Detailed Description of the present application.

Figure 1:
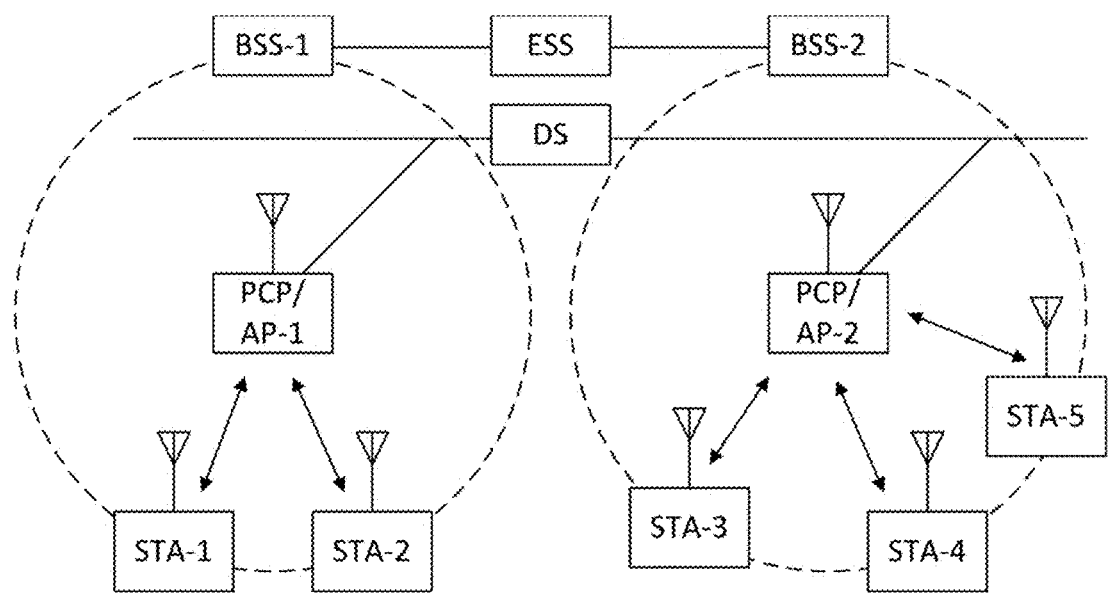
FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a transceiver and according to the embodiment, may further include a user interface unit and a display unit. The processor may generate a frame to be transmitted through a wireless network or process a frame received through the wireless network and besides, perform various processing for controlling the station. In addition, the transceiver is functionally connected with the processor and transmits and receives frames through the wireless network for the station.

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
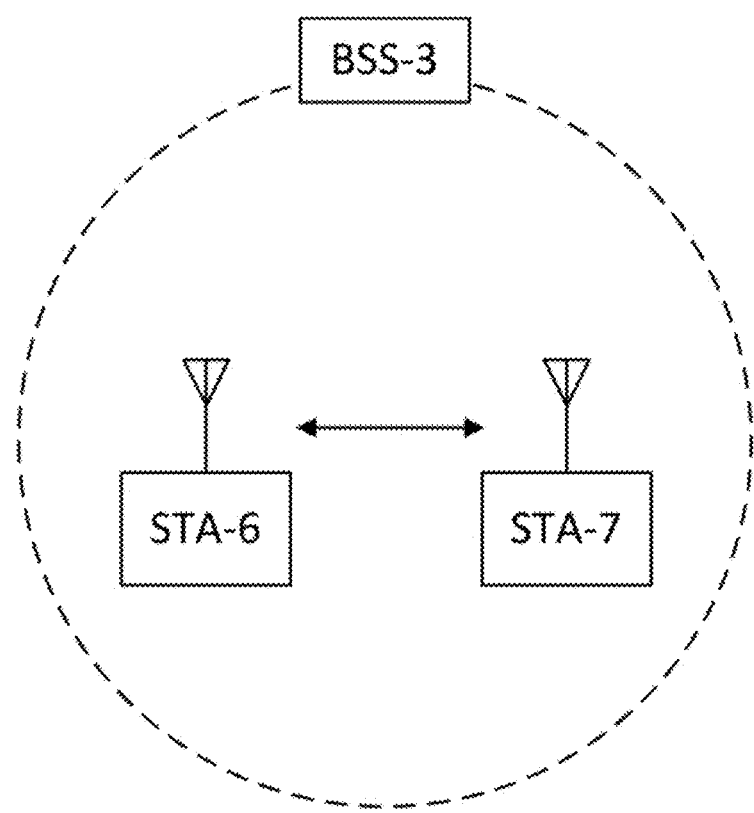
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
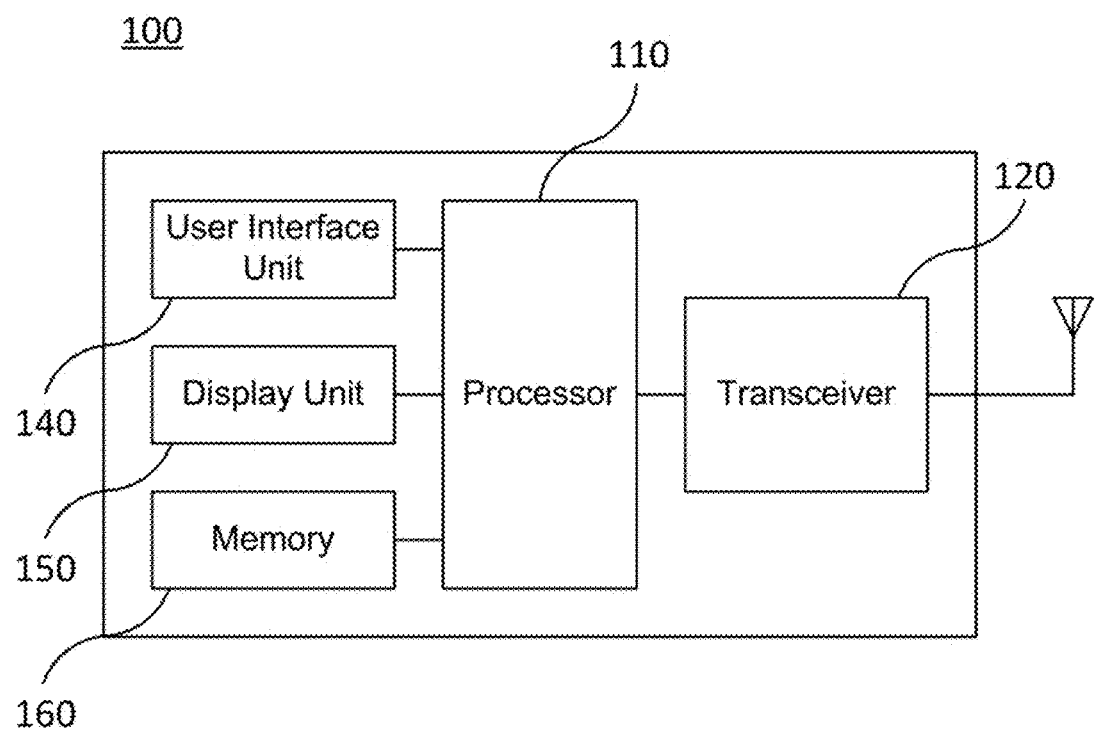
FIG. 3 is a block diagram illustrating a configuration of a station according to an embodiment of the present invention.

FIG. 3 is a block diagram illustrating a configuration of a station 100 according to an embodiment of the present invention.

As illustrated in FIG. 3, the station 100 according to the embodiment of the present invention may include a processor 110, a transceiver 120, a user interface unit 140, a display unit 150, and a memory 160.

First, the transceiver 120 transmits and receives a wireless signal such as a wireless LAN packet, or the like and may be embedded in the station 100 or provided as an exterior. According to the embodiment, the transceiver 120 may include at least one transmit/receive module using different frequency bands. For example, the transceiver 120 may include transmit/receive modules having different frequency bands such as 2.4 GHz, 5 GHz, and 60 GHz. According to an embodiment, the station 100 may include a transmit/receive module using a frequency band of 6 GHz or more and a transmit/receive module using a frequency band of 6 GHz or less. The respective transmit/receive modules may perform wireless communication with the AP or an external station according to a wireless LAN standard of a frequency band supported by the corresponding transmit/receive module. The transceiver 120 may operate only one transmit/receive module at a time or simultaneously operate multiple transmit/receive modules together according to the performance and requirements of the station 100. When the station 100 includes a plurality of transmit/receive modules, each transmit/receive module may be implemented by independent elements or a plurality of modules may be integrated into one chip.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the transceiver 120, and the like. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the transceiver 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
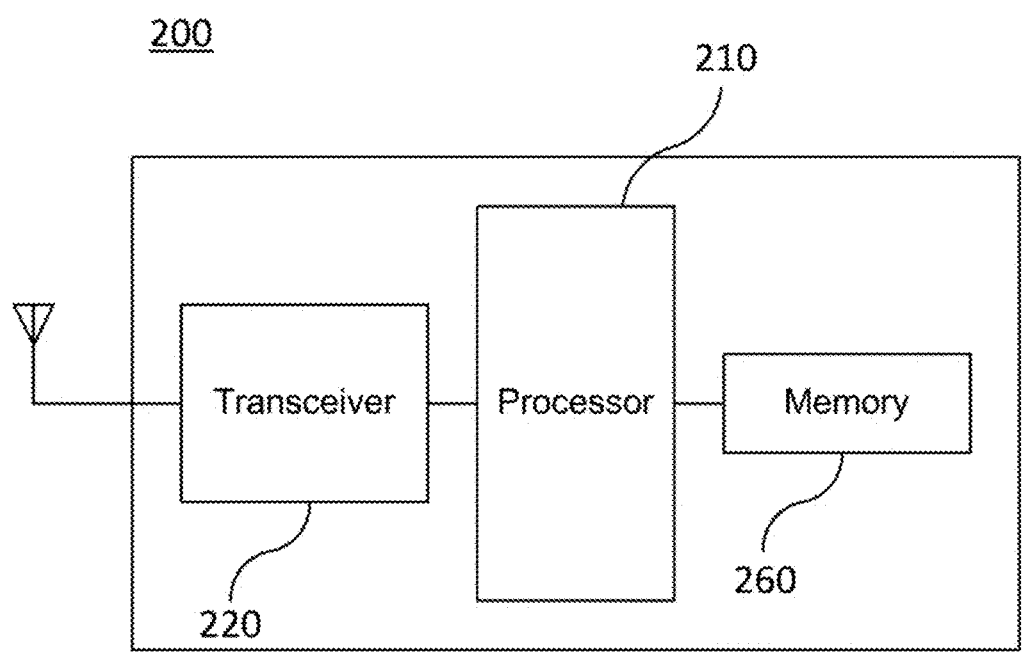
FIG. 4 is a block diagram illustrating a configuration of an access point according to an embodiment of the present invention.

FIG. 4 is a block diagram illustrating a configuration of an AP 200 according to an embodiment of the present invention.

As illustrated in FIG. 4, the AP 200 according to the embodiment of the present invention may include a processor 210, a transceiver 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the transceiver 220 for operating the BSS in at least one frequency band. As described in the embodiment of FIG. 3, the transceiver 220 of the AP 200 may also include a plurality of transmit/receive modules using different frequency bands. That is, the AP 200 according to the embodiment of the present invention may include two or more transmit/receive modules among different frequency bands, for example, 2.4 GHz, 5 GHz, and 60 GHz together. Preferably, the AP 200 may include a transmit/receive module using a frequency band of 6 GHz or more and a transmit/receive module using a frequency band of 6 GHz or less. The respective transmit/receive modules may perform wireless communication with the station according to a wireless LAN standard of a frequency band supported by the corresponding transmit/receive module. The transceiver 220 may operate only one transmit/receive module at a time or simultaneously operate multiple transmit/receive modules together according to the performance and requirements of the AP 200.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. The processor 210 controls various operations such as wireless signal transmission/reception of the AP 200 according to the embodiment of the present invention. A detailed embodiment thereof will be described below.

Figure 5:
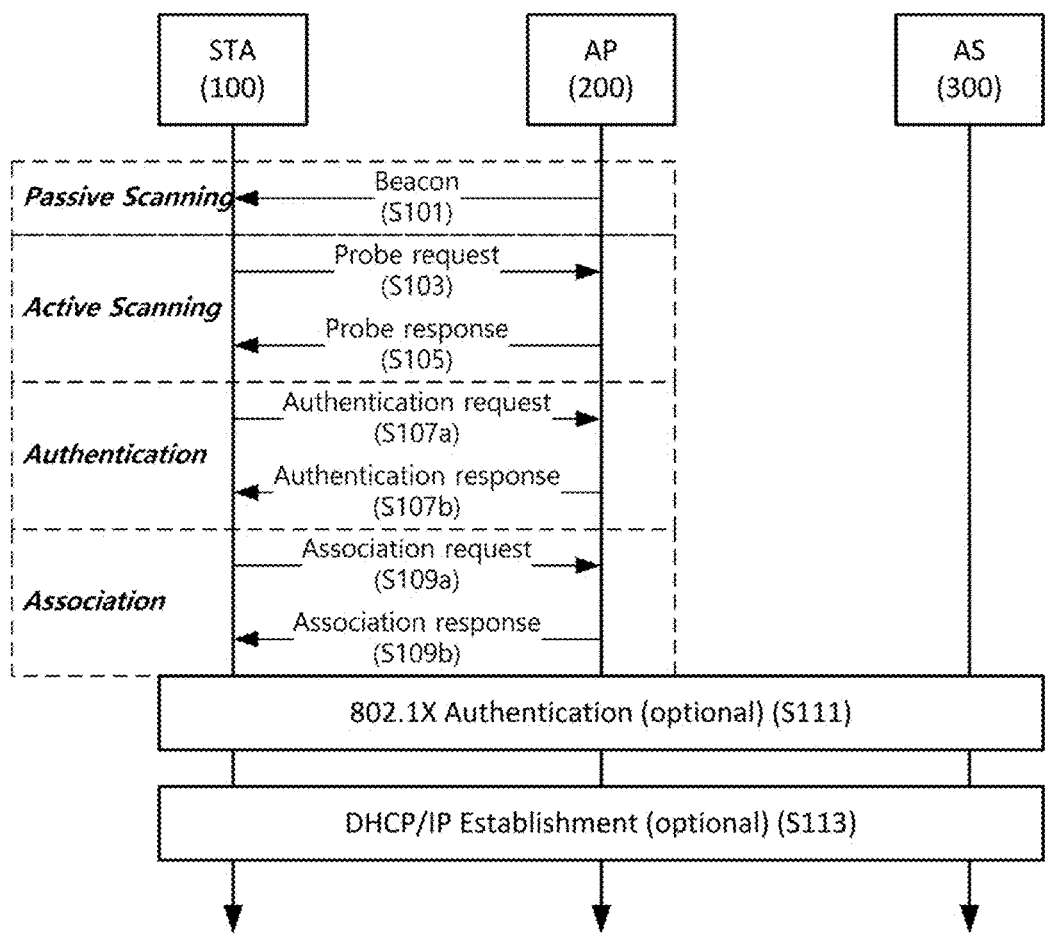
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107*a*) and receiving an authentication response from the AP 200 (S107*b*). After the authentication step is performed, the STA 100 performs the association step by transmitting an association request (S109*a*) and receiving an association response from the AP 200 (S109*b*). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
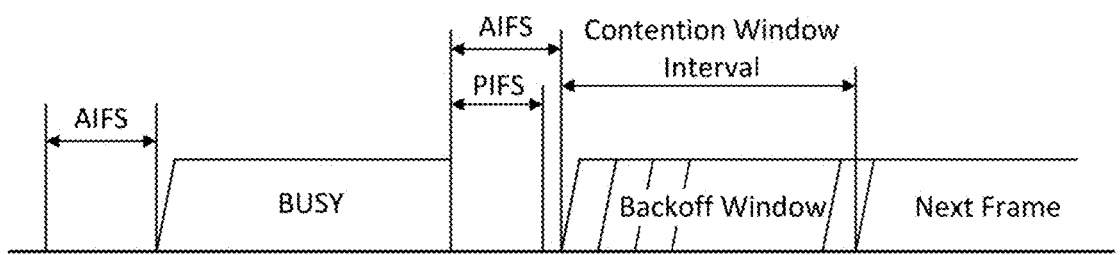
FIG. 6 illustrates a carrier sense multiple access (CSMA)/ collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an interframe space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number assigned to the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Figure 7:
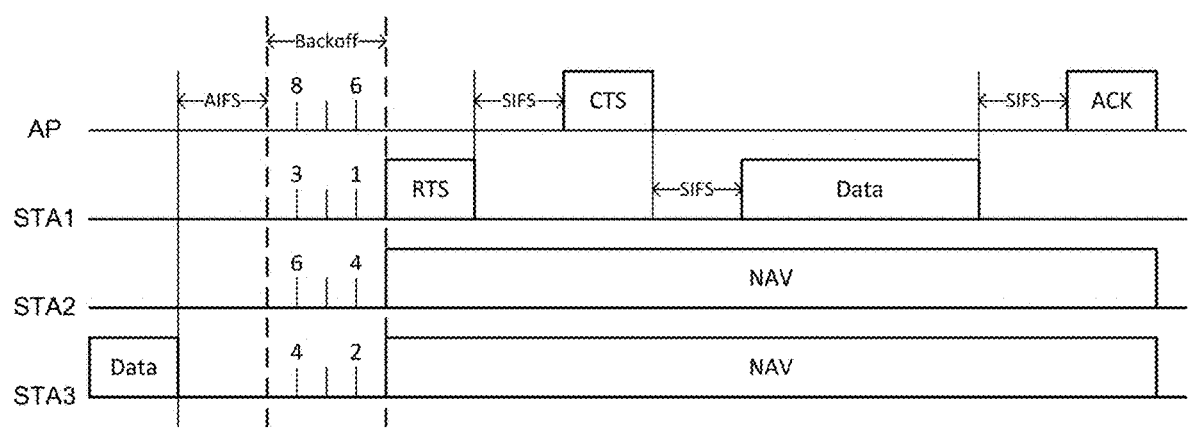
FIG. 7 illustrates a method for performing a distributed coordination function (DCF) using a request to send (RTS) frame and a clear to send (CTS) frame.

FIG. 7 is a diagram illustrating a method for performing a distributed coordination function using a request to send (RTS) frame and a clear to send (CTS) frame.

The AP and STAs in the BSS contend in order to obtain an authority for transmitting data. When data transmission at the previous step is completed, each terminal having data to be transmitted performs a backoff procedure while decreasing a backoff counter (alternatively, a backoff timer) of a random number allocated to each terminal after an AFIS time. A transmitting terminal in which the backoff counter expires transmits the request to send (RTS) frame to notify that corresponding terminal has data to transmit. According to an exemplary embodiment of FIG. 7, STA1 which holds a lead in contention with minimum backoff may transmit the RTS frame after the backoff counter expires. The RTS frame includes information on a receiver address, a transmitter address, and duration. A receiving terminal (i.e., the AP in FIG. 7) that receives the RTS frame transmits the clear to send (CTS) frame after waiting for a short IFS (SIFS) time to notify that the data transmission is available to the transmitting terminal STA1. The CTS frame includes the information on a receiver address and duration. In this case, the receiver address of the CTS frame may be set identically to a transmitter address of the RTS frame corresponding thereto, that is, an address of the transmitting terminal STA1.

The transmitting terminal STA1 that receives the CTS frame transmits the data after a SIFS time. When the data transmission is completed, the receiving terminal AP transmits an acknowledgment (ACK) frame after a SIFS time to notify that the data transmission is completed. When the transmitting terminal receives the ACK frame within a predetermined time, the transmitting terminal regards that the data transmission is successful. However, when the transmitting terminal does not receive the ACK frame within the predetermined time, the transmitting terminal regards that the data transmission is failed. Meanwhile, adjacent terminals that receive at least one of the RTS frame and the CTS frame in the course of the transmission procedure set a network allocation vector (NAV) and do not perform data transmission until the set NAV is terminated. In this case, the NAV of each terminal may be set based on a duration field of the received RTS frame or CTS frame.

In the course of the aforementioned data transmission procedure, when the RTS frame or CTS frame of the terminals is not normally transferred to a target terminal (i.e., a terminal of the receiver address) due to a situation such as interference or a collision, a subsequent process is suspended. The transmitting terminal STA1 that transmitted the RTS frame regards that the data transmission is unavailable and participates in a next contention by being allocated with a new random number. In this case, the newly allocated random number may be determined within a range (2*CW) twice larger than a previous predetermined random number range (a contention window, CW).

Multi-User Uplink Transmission

When using an orthogonal frequency division multiple access (OFDMA) or a multi-input multi-output (MIMO), one wireless communication terminal can simultaneously transmit data to a plurality of wireless communication terminals. Further, one wireless communication terminal can simultaneously receive data from a plurality of wireless communication terminals. For example, a multi-user downlink transmission in which an AP simultaneously transmits data to a plurality of STAs, and a multi-user uplink transmission in which a plurality of STAs simultaneously transmit data to the AP may be performed.

In order to perform the multi-user uplink transmission, the channel to be used and the transmission start time of each STA that performs uplink transmission should be adjusted. In order to efficiently schedule the multi-user uplink transmission, state information of each STA needs to be transmitted to the AP. According to an embodiment of the present invention, information for scheduling of a multi-user uplink transmission may be indicated through a predetermined field of a preamble of a packet and/or a predetermined field of a MAC header. For example, a STA may indicate information for multi-user uplink transmission scheduling through a predetermined field of a preamble or a MAC header of an uplink transmission packet, and may transmit the information to an AP. In this case, the information for multi-user uplink transmission scheduling includes at least one of buffer status information of each STA, channel state information measured by each STA. The buffer status information of the STA may indicate at least one of whether the STA has uplink data to be transmitted, the access category (AC) of the uplink data and the size (or the transmission time) of the uplink data.

According to an embodiment of the present invention, the multi-user uplink transmission process may be managed by the AP. The multi-user uplink transmission may be performed in response to a trigger frame transmitted by the AP. The STAs simultaneously transmit uplink data a predetermined IFS time after receiving the trigger frame. The trigger frame indicates the data transmission time point of the uplink STAs and may inform the channel (or subchannel) information allocated to the uplink STAs. When the AP transmits the trigger frame, a plurality of STAs transmit uplink data through the respective allocated subcarriers at a time point designated by the trigger frame. After the uplink data transmission is completed, the AP transmits an ACK to the STAs that have successfully transmitted the uplink data. In this case, the AP may transmit a predetermined multi-STA Block ACK (M-BA) as an ACK for a plurality of STAs.

In the non-legacy wireless LAN system, a specific number, for example, 25, 52, or 102 tones may be used as a resource unit (RU) for a subchannel-based access in a channel of 20 MHz band. Accordingly, the trigger frame may indicate identification information of each STA participating in the multi-user uplink transmission and information of the allocated resource unit. The identification information of the STA includes at least one of an association ID (AID), a partial AID, and a MAC address of the STA. Further, the information of the resource unit includes the size and placement information of the resource unit.

On the other hand, in the non-legacy wireless LAN system, multi-user uplink transmission may be performed based on a contention of a plurality of STAs for a specific resource unit. For example, if an AID field value for a particular resource unit is set to a specific value (e.g., 0) that is not assigned to STAs, a plurality of STAs may attempt random access (RA) for the corresponding resource unit. Therefore, there is a need for a method of allocating resources for a random access based multi-user uplink transmission of such a plurality of STAs.

Figure 8:
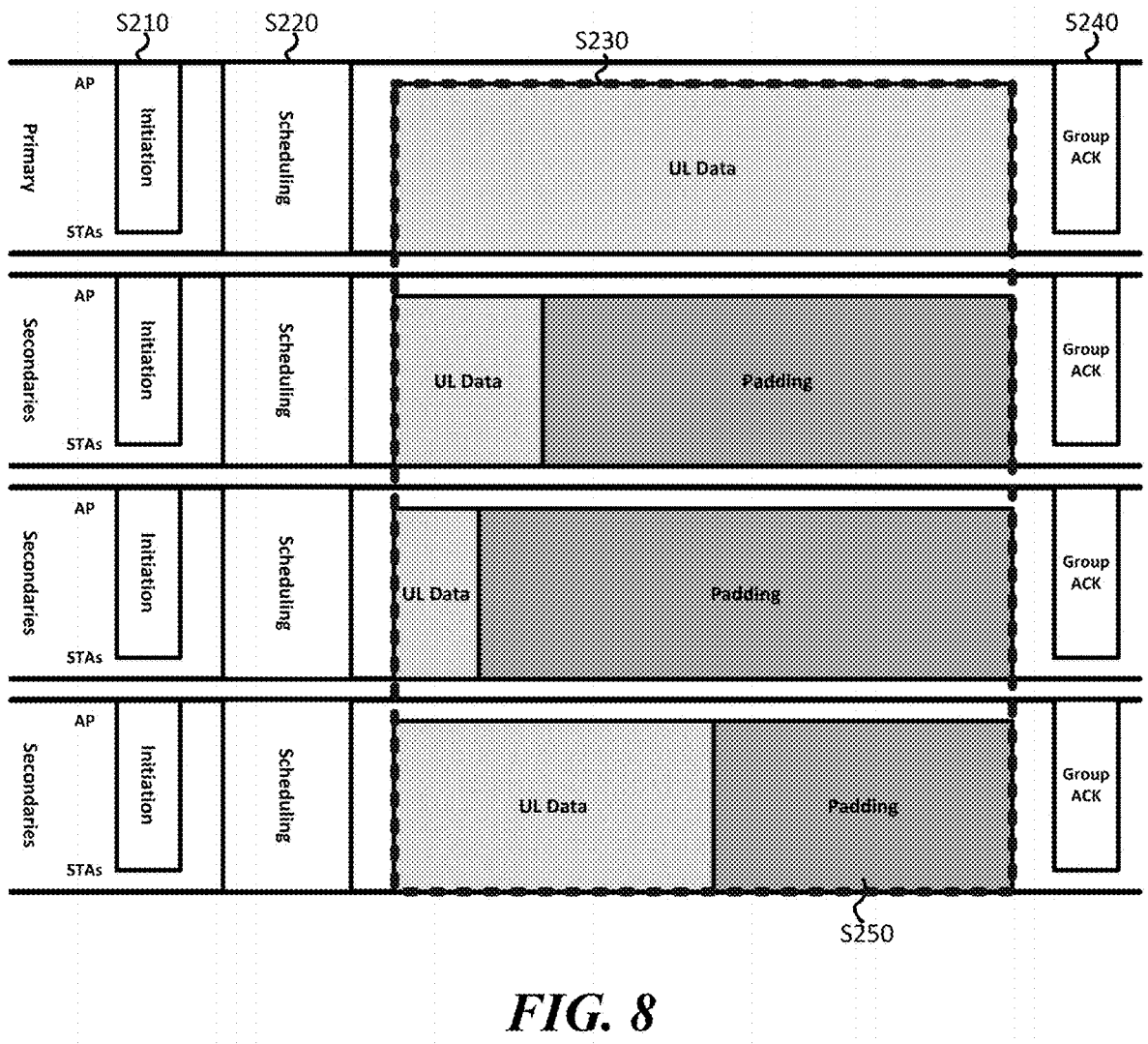
FIG. 8 illustrates a sequence of processes in which a multi-user uplink transmission is performed according to an embodiment of the present invention.

FIG. 8 illustrates a sequence of processes in which a multi-user uplink transmission is performed according to an embodiment of the present invention. As described above, the multi-user uplink transmission process may be managed by the AP because a plurality of terminals simultaneously transmit data. Therefore, in order to allocate resources and prevent data collision, the AP should obtain the buffer status information of each STA and deliver the accurate transmission time point information to each STA before the start of multi-user uplink transmission. The buffer status information of the STA may indicate at least one of whether the STA has uplink data to be transmitted, the access category of the uplink data, and the size (or the transmission time) of the uplink data. Such information delivery of each STA may be performed through an initialization step S210 and a scheduling step S220 for the multi-user uplink transmission.

According to an embodiment of the present invention, the scheduling step S220 for the multi-user uplink transmission is performed in advance to collect related information, and the initialization step S210 may be performed if a specific condition is satisfied. Alternatively, the initialization step S210 may be performed in advance according to the time condition, and then the scheduling step S220 may be performed next to collect the related information. The initializing step S210 and the scheduling step S220 include a process of exchanging information on channels available to the AP and the STA. According to an exemplary embodiment, the AP may transmit available channel information to a plurality of STAs in advance, and the plurality of STAs may feedback channel information available to the corresponding STA among the channels available to the AP. The specific operation method of the initializing step S210 and the scheduling step S220 in the embodiment of the present invention is not limited thereto. According to an embodiment, the initialization step S210 and the scheduling step S220 may be performed with an integrated operation.

When the initialization step S210 and the scheduling step S220 are performed, a multi-user uplink data transmission step S230 is performed. At least one STA assigned a channel or a subchannel from the AP simultaneously transmits uplink data at the time point designated by the AP. The STA may perform uplink data transmission through a 20 MHz channel basis or a wideband channel basis over the 20 MHz. In addition, the non-legacy STA may perform uplink data transmission through a subchannel basis smaller than 20 MHz. The AP receiving the uplink data from the STA transmits an ACK in response thereto (S240). If uplink data transmission is performed through a subchannel basis, a plurality of STAs can transmit uplink data through one channel. In this case, the AP may transmit a group ACK through the corresponding channel to transmit an ACK for a plurality of STAs that transmitted the uplink data.

In case of being affected by a plurality of external BSSs in a dense BSS environment, the available channels of each terminal may be different from each other according to the geographical location of the wireless terminal. Therefore, the number of terminals capable of data transmission through each channel may be different from each other. In this case, as shown in FIG. 8, the air time during which actual uplink data transmission is performed may be different for each channel. However, if the AP cannot simultaneously perform data transmission and reception, the AP cannot transmit an ACK through another channel in which uplink data transmission has been completed while receiving uplink data through a channel in which the air time is long. Therefore, the STAs using the channel in which the air time is short may perform zero padding S450 until the uplink data transmission of a channel having the longest air time is completed, to wait for ACK reception.

Figure 9:
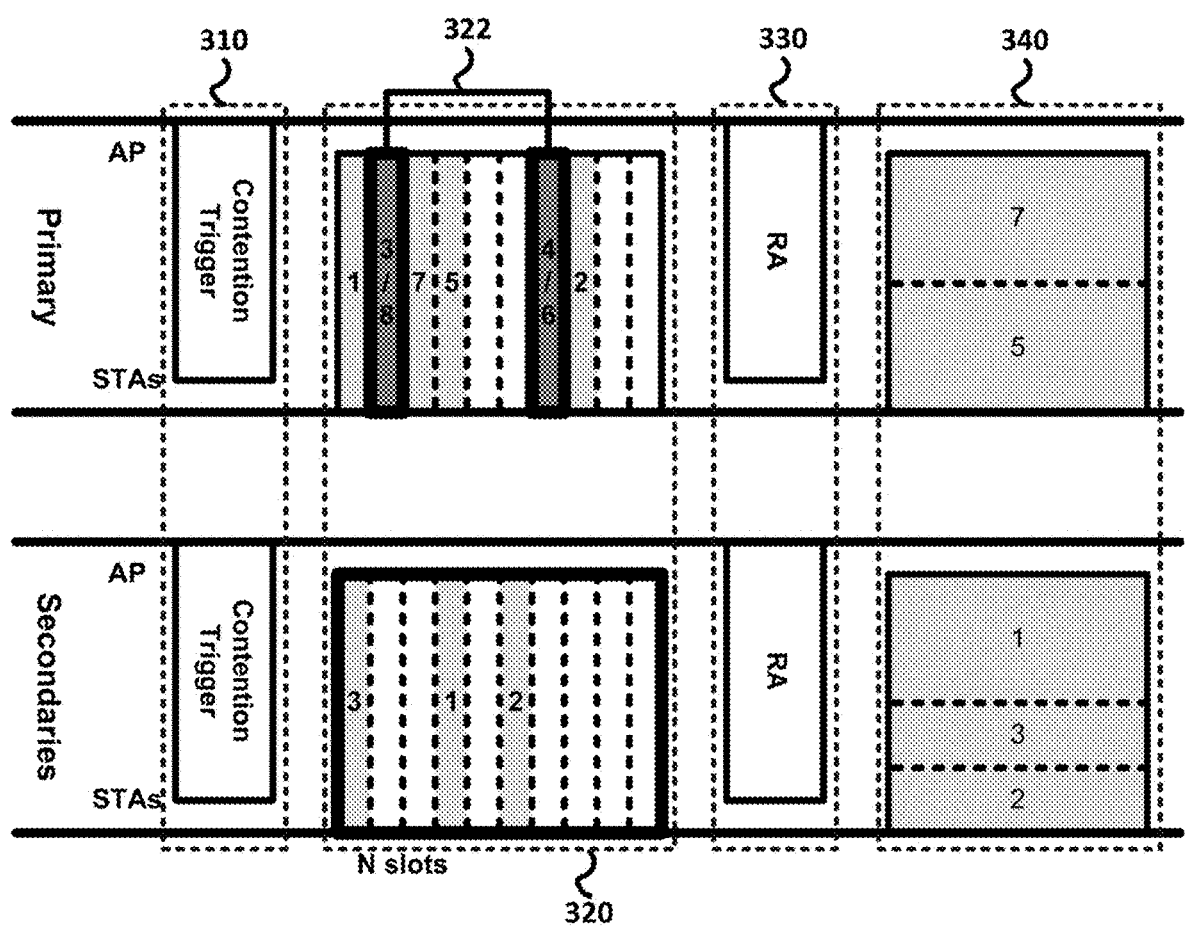
FIG. 9 illustrates a scheduling method for a multi-user uplink data transmission according to an embodiment of the present invention.

FIG. 9 illustrates a scheduling method for a multi-user uplink data transmission according to an embodiment of the present invention.

To initiate a multi-user uplink data transmission, the AP transmits a contention trigger frame 310. The contention triggered frame 310 triggers contention-based multi-user uplink transmission. In addition, the contention trigger frame 310 initiates a random access based multi-user uplink transmission process. According to an embodiment, the contention trigger frame 310 may include synchronization information for the multi-user uplink transmission, and channel information to be used for the uplink transmission.

The STAs receiving the contention trigger frame 310 contend to participate in the multi-user uplink transmission. According to an embodiment of the present invention, STAs having frames to be transmitted transmit request frames 320 in response to the contention trigger frame 310. STAs having frames to be transmitted may participate in independent contentions on all the channels available to the STA among the channels specified by the contention trigger frame. According to an embodiment of the present invention, the contention for participating in the multi-user uplink transmission may be performed through a backoff procedure. The STAs participating in the contention allocates a backoff counter with a random number within a predetermined contention window range. The STA performs a backoff procedure based on the allocated backoff counter and transmits the request frame 320 when the backoff counter expires.

In the backoff procedure, the STA decrements the backoff counter by 1 for every resource unit allocated for random access. As described later, the resource units are divided based on at least one unit of subchannel and time. If N resource units are allocated for the random access, the STAs can decrement the backoff counter value by a maximum of N in one contention process. According to an embodiment, a backoff counter for the backoff procedure of each STA may be allocated in the range of 0 to k*N. In this case, k is a constant having a value greater than or equal to 1. If the STA selects a number greater than N as a backoff counter, the STA cannot transmit the request frame 320 in the first contention. The STA performs a next contention using a value obtained by subtracting N from the initially allocated backoff counter.

According to an embodiment, the STA may transmit the request frame 320 after waiting for additional slots based on the access category (AC) or user priority of the data to be transmitted. For example, a STA having data of VO access category which is the highest priority or NC user priority may transmit the request frame 320 immediately without additional slots after the backoff counter expires. However, the STA having background data which is the lower priority may transmit the request frame 320 after additionally waiting for preset slots after expiration of the backoff counter. The number of additional waiting slots according to the access category or user priority may be determined based on the total number of slots N of the contention procedure.

According to an embodiment of the present invention, the request frame 320 includes buffer status information of the corresponding STA. That is, the AP transmits a contention trigger frame 310 requesting a buffer status report of at least one STA, and the STAs receive the contention trigger frame 310. STAs having data to be transmitted transmit a request frame 320 including buffer status information of the corresponding terminal to the AP in response to the contention trigger frame 310. In this case, the buffer status information may be transmitted on a random access basis. Alternatively, the buffer status information may also be transmitted based on the backoff procedure described above.

Thus, the STAs participating in the multi-user uplink transmission transmit their frames on the basis of contention. In FIG. 9, each slot represents a resource unit, and the number in the slot indicates the identifier of the STA that transmitted the request frame 320. The request frame 320 transmitted by the STA may be a buffer status report of the STA. The request frame 320 includes at least one of identifier information of the corresponding STA, size information of transmission data, and AC (or user priority) information of transmission data. The identifier information of the STA indicates any one of the AID, the partial AID, or the MAC address of the STA. According to an embodiment, when the size of the basic resource unit for the multi-user uplink transmission is specified, the transmission data size information of the request frame 320 may be represented as an integer multiple of the resource unit.

Upon receiving the request frame 320 from a plurality of STAs, the AP transmits an uplink transmission trigger frame 330 in response thereto. The uplink transmission trigger frame 330 triggers the transmission of multi-user uplink data 340 of a plurality of STAs. According to an embodiment, the AP receives the request frames 320 transmitted by the STAs and allocates resources based on the received request frames 320. The uplink transmission trigger frame 330 may indicate a resource allocation (RA) result of the AP. According to the embodiment of the present invention, when a plurality of STAs transmit a request frame through the same resource unit and a collision 322 occurs, resources are not allocated to the corresponding STAs. The STA that has not been allocated the resource despite the transmission of the request frame 320 selects an arbitrary backoff counter in the next contention process and participates in the contention. According to an embodiment, the backoff counter of the STA attempting retransmission after the collision may be allocated in the range of 0 to $\alpha*K*N$. In this case, $\alpha$ is a constant greater than 1. In addition, if collision occurs consecutively, the range of the backoff counter selection of the STA may be increased for each collision.

When the AP transmits the uplink transmission trigger frame 330, the plurality of STAs perform transmission of the multi-user uplink data 340 in response thereto. The STAs that have successfully transmitted the request frame 320 in the uplink transmission contention step simultaneously transmit uplink data 340 in response to the uplink transmission trigger frame 330 of the AP. In the embodiment of FIG. 9, STA5 and STA7 that have successfully transmitted the request frame 320 transmit uplink data 340 through the primary channel, and STA1, STA2, and STA3 transmit uplink data 340 through the secondary channel. However, STA3, STA4, STA6, and STA8 that have failed to transmit the request frame 320 due to a collision do not transmit uplink data 340 in response to the uplink transmission trigger frame 330.

Thus, according to the embodiment of the present invention, the AP transmits a predefined trigger frame for the multi-user uplink transmission. The plurality of STAs receiving the trigger frame simultaneously transmit uplink data to the AP at a time designated by the trigger frame. In the multi-user uplink data transmission, a plurality of STAs can acquire a transmission opportunity through contention.

Meanwhile, in a wireless LAN environment in which a plurality of BSSs are adjacent to each other, the measured channel states may be different from each other even in the same BSS. That is, depending on the influence of the neighboring other BSS (OBSS) of each STA, the secondary channels to which each STA can access may be different from each other. As a result, the primary channel has the highest probability of collision 322 between the request frames 320 because the largest number of STAs participate in the contention each time. In order to solve this problem, according to the embodiment of the present invention, it is possible to restrict participation of contention in the primary channel of the STAs capable of transmitting the request frame through the secondary channel. In this case, participation of contention in the primary channel may be completely restricted, or may be restricted probabilistically. For example, the greater the number of available secondary channels for each STA, the lower the probability of participation of contention in the primary channel.

Meanwhile, although not illustrated in FIG. 9, an ACK for the multi-user uplink transmission may be transmitted as needed. That is, the AP may transmit ACK for the request frame 320 of the plurality of STAs and the multi-user uplink data 340, respectively. The ACK may be a predetermined multiple-STA block ACK (M-BA). According to an embodiment, the ACK for the contention trigger frame 310 and the uplink transmission trigger frame 330 transmitted by the AP may be respectively replaced by the multi-user uplink transmission frame 320, 340 transmitted by at least one STA.

Figure 10:
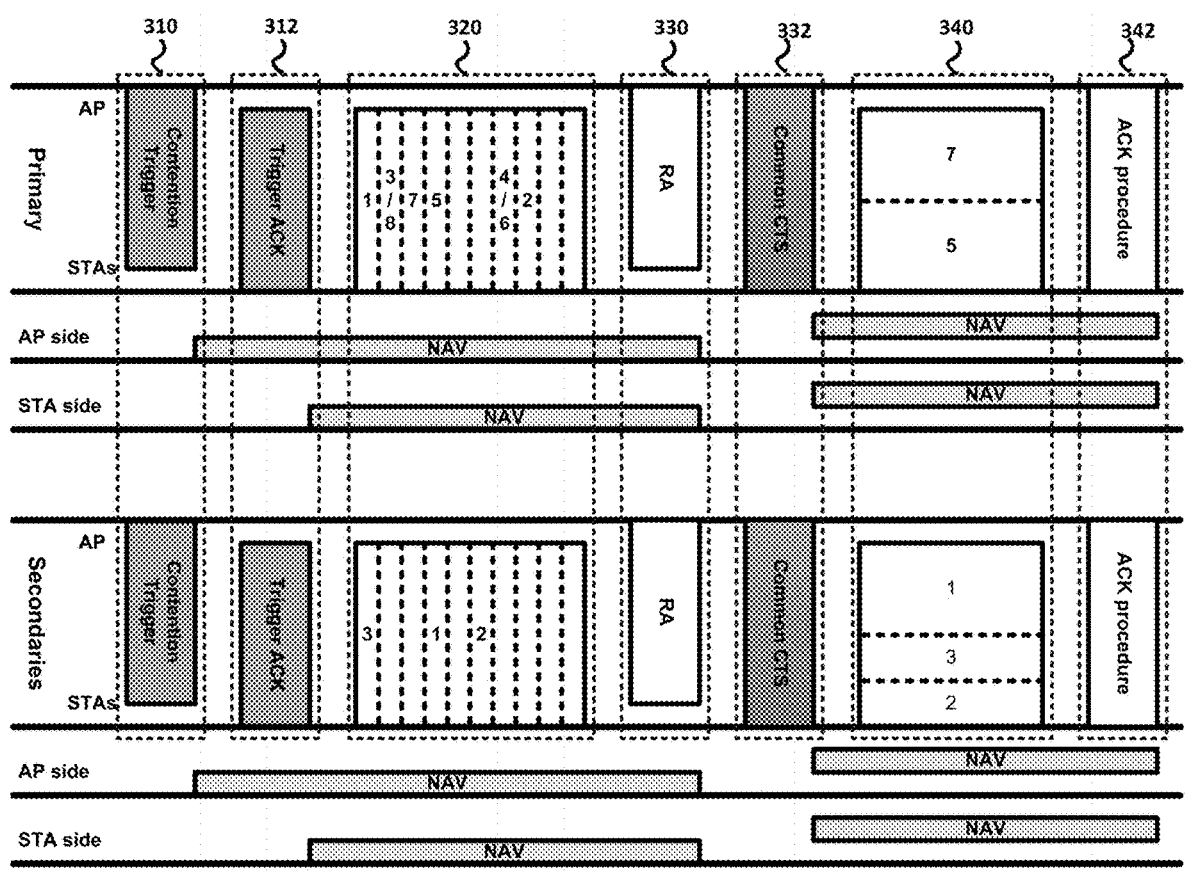
FIG. 10 illustrates a method of setting NAVs for a multi-user uplink data transmission according to an embodiment of the present invention.

FIG. 10 illustrates a method of setting NAVs for a multi-user uplink data transmission according to an embodiment of the present invention. In the embodiment of FIG. 10, the same or corresponding parts as those of the above-described embodiment of FIG. 9 will be omitted.

If the NAV is not set in the aforementioned contention step, interference by the OBSS terminals may occur. For example, when the STA1 transmits the request frame 320, the STA1 waits until it receives the uplink transmission trigger frame 330 of the AP. If the STA1 and the neighboring OBSS terminals are located at positions where they cannot receive the request frame 320 of other STAs except the STA1, the OBSS terminals may attempt a new transmission after determining that the channel is idle for the time from the transmission of the request frame 320 to the transmission of the uplink data 340 of the STA1. According to the embodiment of the present invention, NAV setting for multi-user uplink transmission is performed to prevent interference of such OBSS terminals.

For NAV setting in the multi-user uplink transmission process, the contention trigger frame 310 may be configured in the RTS or CTS frame format. According to an exemplary embodiment, a separate group MAC address for STAs participating in multi-user uplink transmission may be allocated, and a CTS-to-group frame including the group MAC address information may be used as a contention trigger frame. The actual transmission length of the multi-user uplink transmission may vary depending on the uplink transmission data length and the resource allocation result of the STAs. There is also a possibility that the transmission of the request frame 320 may not be performed in the contention step. Therefore, the duration field value of the contention trigger frame 310 may be set to a period up to the transmission time of the uplink transmission trigger frame 330.

When the contention trigger frame 310 is transmitted, the STAs participating in the multi-user uplink transmission transmit the trigger ACK 312 in response thereto. The trigger ACK 312 simultaneously transmitted by a plurality of STAs may be set to the same waveform. According to an embodiment, the trigger ACK 312 may be configured in a CTS frame format, and the duration field value of the trigger ACK 312 may be set to a period up to the transmission time of the uplink transmission trigger frame 330. A plurality of STAs transmit a trigger ACK 312 to perform a response to the contention trigger frame 310.

When the transmission of the request frame 320 of a plurality of STAs is completed and the AP transmits the uplink transmission trigger frame 330, the actual transmission length of the multi-user uplink data 340 is determined. Accordingly, a CTS frame 332 may be transmitted for NAV setting during the period between the transmission time of the uplink transmission trigger frame 330 and the transmission time of the ACK 342 for the multi-user uplink data 340. The CTS frame 332 may be transmitted by a plurality of STAs participating in the transmission of the multi-user uplink data 340 by being allocated resources. Alternatively, the CTS frame 332 may be transmitted by a plurality of STAs and the AP together. The CTS frame 332 transmitted by the plurality of STAs and the AP may be set to the same waveform. The duration field value of the CTS frame 332 is set to the period up to the transmission time of the ACK 342 for the multi-user uplink data 340. The STA that has participated in the contention but has not been allocated the resource does not transmit the CTS frame 332. Therefore, the OBSS terminal located adjacent to the STA may cancel the NAV setting after the transmission of the uplink transmission trigger frame 330 and attempt a new transmission.

Figure 11:
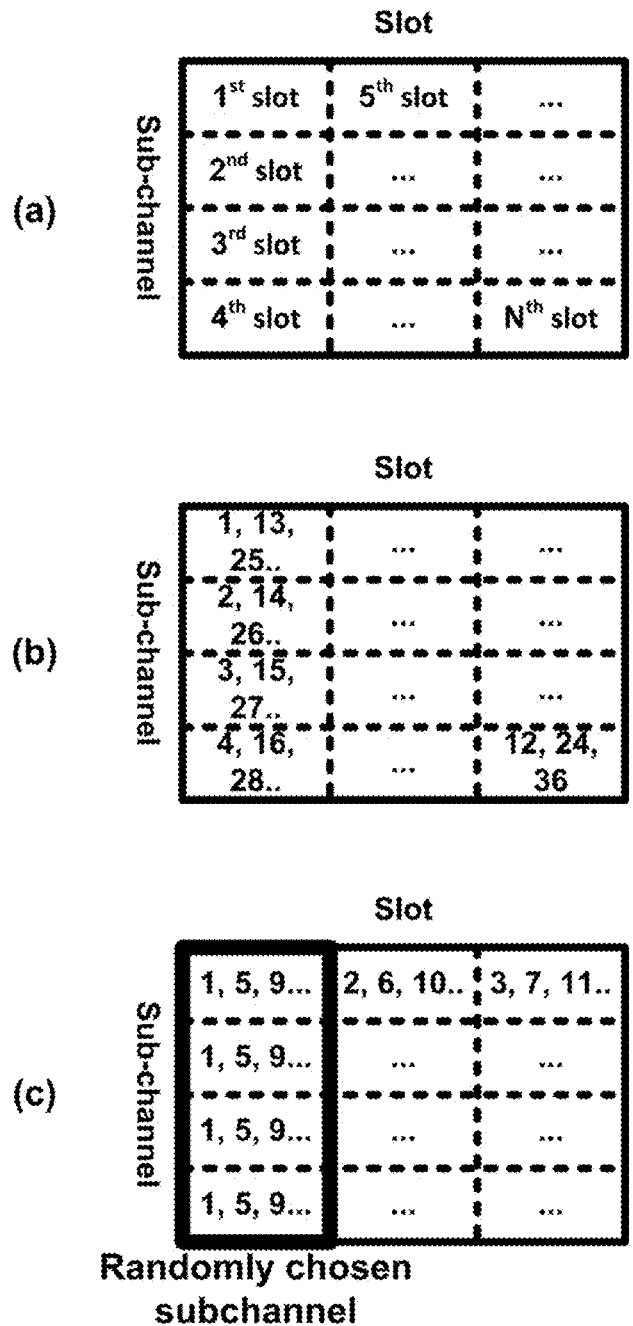
FIG. 11 illustrates a method of configuring a resource unit according to an embodiment of the present invention.

FIG. 11 illustrates a method of configuring a resource unit according to an embodiment of the present invention.

First, referring to FIG. 11(a), a resource unit may be divided based on at least one unit of subchannel and time. The non-legacy wireless LAN system may support a higher-order FFT than the legacy system, and a plurality of resource units may be included in one OFDM symbol. Thus, each slot constituting a resource unit can be arranged in time and subchannel axis. The plurality of STAs transmit the request frame using the resource unit set in this way. In the contention step, the STAs may randomly select at least one of the plurality of resource units and transmit the request frame.

FIGS. 11(b) and 11(c) illustrate embodiments in which STAs select a resource unit. In the FIGS. 11(b) and 11(c), the number in each slot exemplifies identifier information of the STA that selected the corresponding slot. The identifier information of the STA includes at least one of an association ID (AID), a partial AID, and a MAC address of the STA.

According to the embodiment of FIG. 11(b), the STAs may select a resource unit based on the identifier information of the corresponding STA. Each STA selects a resource unit based on a value obtained by modulating the identifier information of the corresponding STA with the number of all resource units.

According to the embodiment of FIG. 11(c), the STA may select a resource unit on the time axis based on the identifier information of the STA, and randomly select a resource unit on the subchannel axis. More specifically, the STA determines the time slot on the time axis based on the value obtained by modulating the identifier information of the STA with the number of resource units on the time axis. Next, the STA may randomly determine subchannel slots on the selected time slot. The STA selects a resource unit corresponding to the determined time slot and subchannel slot. However, the present invention is not limited thereto, and the STA may select a resource unit on the subchannel axis based on the identifier information of the STA, and randomly select a resource unit on the time axis.

Figure 12:
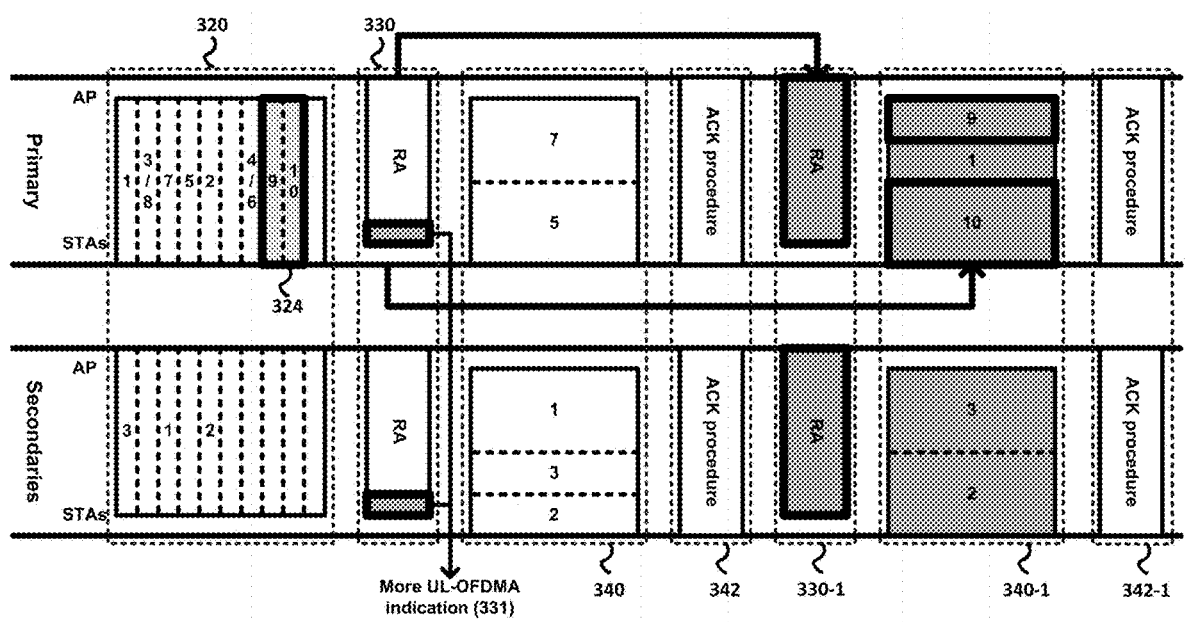
FIGS. 12 and 13 illustrate a consecutive multi-user uplink transmission method according to an embodiment of the present invention.
Figure 13:
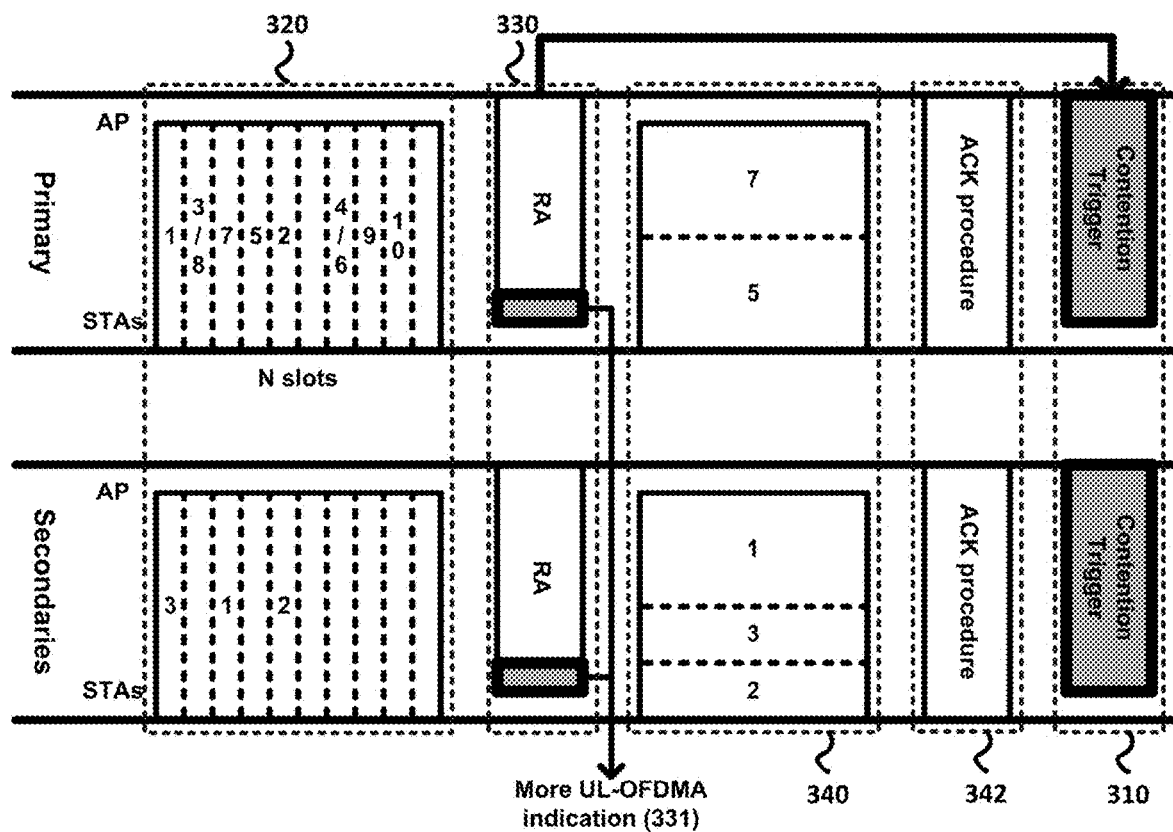

FIGS. 12 and 13 illustrate a consecutive multi-user uplink transmission method according to an embodiment of the present invention. In the embodiment of FIGS. 12 and 13, the same or corresponding parts as those of the above-described embodiments of FIGS. 9 and 10 will be omitted.

FIG. 12 illustrates an embodiment of a consecutive multi-user uplink transmission method. When a large number of STAs transmit the request frame 320 during the contention process, data transmission requests exceeding the maximum transmission opportunity (TXOP) may be delivered to the AP. Therefore, although some STAs normally have transmitted the request frame 320 as indicated by reference numeral 324, resources may not be allocated to the corresponding STAs in the course of a single multi-user uplink transmission. Also, the resources allocated to some STAs may be insufficient to transmit the entire data in the buffer of the corresponding STAs.

According to the embodiment of the present invention, a process of consecutive multi-user uplink data 340 and 340-1 transmissions may be performed. The AP transmits a plurality of uplink transmission trigger frames 330 and 330-1 in a consecutive sequence to trigger the consecutive multi-user uplink data 340 and 340-1 transmissions. To this end, the trigger frames 330, 330-1 transmitted by the AP may include a predetermined field 331 indicating whether additional multi-user uplink data (i.e., additional UL-OFDMA) transmission is performed.

According to the embodiment of the present invention, the predetermined field 331 included in the uplink transmission trigger frames 330 and 330-1 may be composed of 1 bit, indicating whether an additional uplink transmission trigger frame is present. That is, the predetermined field 331 of the trigger frame 330 indicates whether or not the additional trigger frame 330-1 follows the current trigger frame 330 within a predetermined period. For the convenience of explanation, in the embodiment of FIG. 12, reference numeral 330 denotes a first trigger frame, and reference numeral 330-1 denotes a second trigger frame.

First, the AP transmits the first trigger frame 330 that triggers a multi-user uplink data transmission of a plurality of STAs. The predetermined field 331 of the first trigger frame 330 indicates the presence or absence of the second trigger frame 330-1 following the first trigger frame 330. If the second trigger frame 330-1 following the first trigger frame 330 is transmitted within a predetermined service period, the predetermined field 331 of the first trigger frame 330 may be set to 1. However, if the first trigger frame 330 is the last trigger frame within the predetermined service period, the predetermined field 331 of the first trigger frame 330 may be set to 0.

When the first trigger frame 330 is transmitted, STAs perform the multi-user uplink data 340 transmission based on the received first trigger frame 330. First, the STAs determine whether or not the received first trigger frame 330 indicates uplink data transmission of the corresponding STA. If the first trigger frame 330 indicates uplink data transmission of the corresponding STA, the corresponding STA performs the multi-user uplink data 340 transmission at the time point designated by the first trigger frame 330. When the multi-user uplink data 340 transmission of the STAs is completed, the AP transmits an ACK 342 in response thereto. According to an embodiment, the ACK 342 may be a predetermined multi-STA block ACK (M-BA).

If the predetermined field 331 of the first trigger frame 330 indicates that an additional trigger frame is present, the second trigger frame 330-1 is transmitted a SIFS time after the ACK 342 is transmitted. The procedure after the second trigger frame 330-1 is transmitted is similar to the procedure after the transmission of the first trigger frame 330 described above. That is, STAs perform the multi-user uplink data 340-1 transmission in response to the second trigger frame 330-1, and when the multi-user uplink data 340-1 transmission is completed, the AP transmits an ACK 342-1. The predetermined field included in the second trigger frame 330-1 indicates whether an additional trigger frame follows the corresponding trigger frame 330-1.

Meanwhile, if the received first trigger frame 330 does not indicate the uplink data transmission of the corresponding STA, the corresponding STA determines the state of the STA based on a value of the predetermined field of the first trigger frame 330. If the predetermined field 331 indicates that an additional trigger frame is present, the corresponding STA maintains the awake state. Accordingly, the STA may receive the second trigger frame 330-1 transmitted after the first trigger frame 330 and perform the multi-user uplink data transmission 340-1 based on the received second trigger frame 330-2. However, if the predetermined field 331 indicates that no additional trigger frame is present, the corresponding STA may switch to the doze state. The STA maintains the doze state until the end of the predetermined service period.

According to the embodiment of FIG. 12, STA9 and STA10 transmit the request frame 320, but are not allocated resources by the first trigger frame 330. STA9 and STA10 identify that the predetermined field 331 of the first trigger frame 330 indicates that an additional trigger frame is present and maintains the awake state. The STA9 and STA10 receive the second trigger frame 330-1 and are allocated resources by the received second trigger frame 330-1. Accordingly, the STA9 and STA10 perform the multi-user uplink data 340-1 transmission in response to the second trigger frame 330-1.

According to a further embodiment of the present invention, when the multi-user uplink data 340, 340-1 transmissions are performed in a consecutive sequence, a transmission of ACK 342 in response to multi-user uplink data 340 which is prior to the last multi-user uplink data 342 may be omitted. In this case, the AP may transmit an integrated ACK at the end of the service period after the transmissions of the consecutive sequence of the multi-user uplink data 340, 340-1 are completed. However, the present invention is not limited thereto.

FIG. 13 illustrates a consecutive multi-user uplink transmission method according to another embodiment of the present invention. In the aforementioned embodiments, although the STAs transmitted the request frame 320, the amount of uplink data in the buffer may not be sufficient to trigger a multi-user uplink data transmission. In this case, the AP may transmit an additional contention trigger frame 310.

Whether or not an additional contention trigger frame 310 is transmitted may be indicated by a predetermined field 331 of the uplink transmission trigger frame 330. That is, according to the embodiment of the present invention, the predetermined field 331 of the uplink transmission trigger frame 330 is composed of 2 or more bits and indicates information including at least one of whether an additional uplink transmission trigger frame is present, whether an additional contention trigger frame is present. According to an embodiment, when the predetermined field 331 of the uplink transmission trigger frame 330 indicates that an additional contention trigger frame is to be transmitted, the STA that is allocated resources by the uplink transmission trigger frame 330 may not participate in the next contention process.

Figure 14:
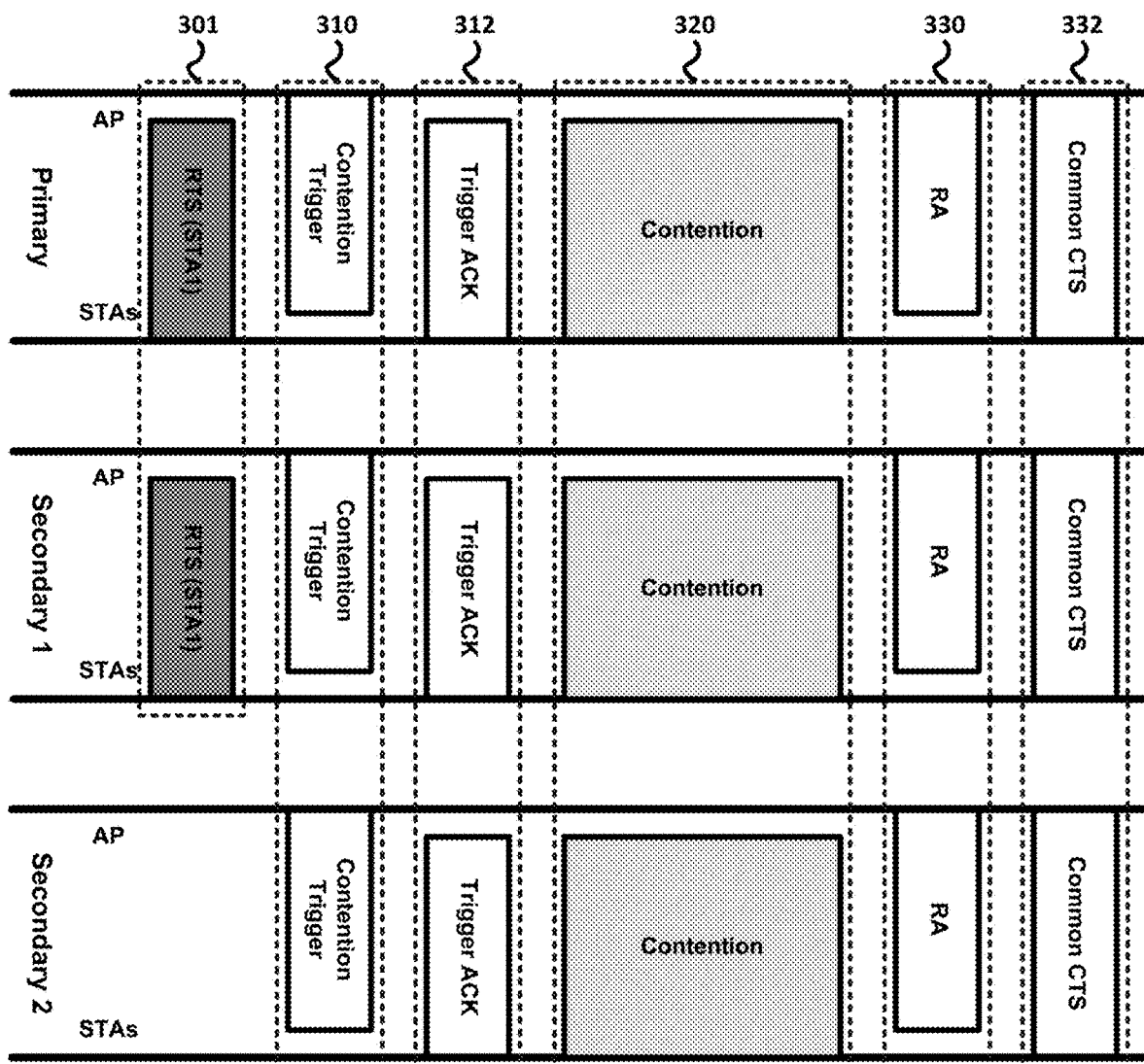
FIG. 14 illustrates a triggering method of a multi-user uplink transmission according to another embodiment of the present invention.

FIG. 14 illustrates a triggering method of a multi-user uplink transmission according to another embodiment of the present invention. In the embodiment of FIG. 14, the same or corresponding parts as those of the above-described embodiments will be omitted.

According to the embodiment of FIG. 14, the multi-user uplink transmission may be triggered by an RTS frame 301 of a STA. STA1, which intends to transmit uplink data through the primary channel and second channel 1, transmits an RTS frame 301 to the AP. The AP transmits the contention trigger frame 310 to induce multi-user uplink transmission of the other STAs together with the uplink transmission of the STA1. In the embodiment of FIG. 14, since the AP can use the primary channel, the secondary channel 1, and the secondary channel 2, the AP transmits the contention trigger frame 310 through the three channels. STAs receiving the contention trigger frame 310 contend to participate in the multi-user uplink transmission and transmit the request frame 320. However, STA1 may not participate in the contention process because a resource for the multi-user uplink transmission is allocated. Meanwhile, the transmission processes of the trigger ACK 312 and the CTS frame 332 for setting the NAV is as described above in the embodiment of FIG. 10.

Figure 15:
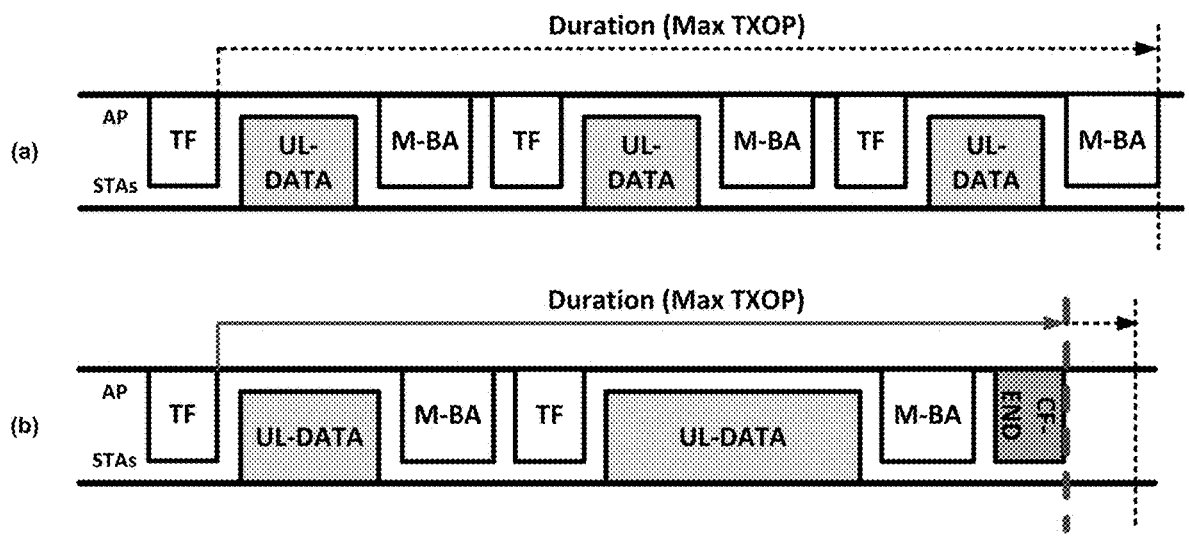
FIG. 15 illustrates a consecutive multi-user uplink data transmission method according to another embodiment of the present invention.

FIG. 15 illustrates a consecutive multi-user uplink data transmission method according to another embodiment of the present invention. The multi-user uplink data transmission is a technique that can maximize spectral efficiency in terms of reducing overhead due to backoff contention of a plurality of STAs. Thus, when the AP starts an initial multi-user uplink data transmission session, the AP may increase the transmission efficiency by setting the NAV to the length of the maximum available TXOP and triggering the multi-user uplink data transmission as shown in FIG. 15. That is, the duration field of the trigger frame (i.e., TF) transmitted first for the multi-user uplink data transmission may be set to a value corresponding to the maximum TXOP. The AP obtains buffer status information of STAs in the BSS in advance, and allocates resources for uplink data transmission in consideration of uplink data size information, uplink data AC information, and channel selectivity of each STA.

In the following embodiments and drawings, TF denotes a trigger frame, UL-DATA denotes multi-user uplink data, DL-DATA denotes multi-user downlink data, and M-BA denotes multi-STA block ACK, respectively.

Referring to FIG. 15(a), transmissions of a trigger frame (i.e., TF), multi-user uplink data (i.e., UL-DATA) and multi-STA block ACK (i.e., M-BA) according to the aforementioned embodiment may be performed. If the NAV remains long enough for additional UL-DATA transmissions after the transmission of the M-BA is completed, the AP triggers the next UL-DATA transmission without returning the NAV. To this end, the AP transmits the next trigger frame (i.e., TF) a SIFS time after the M-BA is transmitted.

FIG. 15(b) illustrates a situation in which the NAV does not remain for a sufficient length for additional UL-DATA transmission after the transmission of the M-BA is completed. According to an exemplary embodiment, the AP may terminate the multi-user uplink data transmission procedure by transmitting a CF-END frame, and return the NAV. According to another embodiment of the present invention, the AP may perform a transmission of a downlink control frame, a management frame, etc. of a short length during the remaining NAV period.

As described above, according to the embodiment of the present invention, consecutive multi-user uplink data transmissions may be performed for a predetermined period. According to an embodiment, the predetermined period may be a predefined maximum TXOP. According to another embodiment, the AP may flexibly select a predetermined period considering the number of terminals in the BSS, the uplink/downlink transmission ratio, traffic congestion, and the like.

Figure 16:
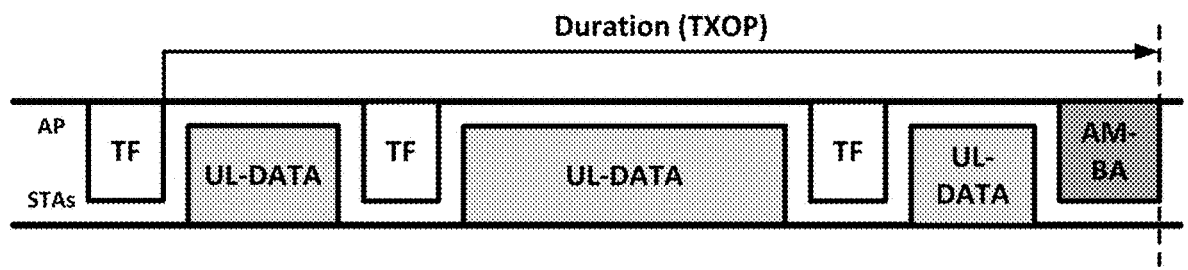
FIG. 16 illustrates a consecutive multi-user uplink data transmission method according to yet another embodiment of the present invention.

FIG. 16 illustrates a consecutive multi-user uplink data transmission method according to yet another embodiment of the present invention. According to the embodiment of FIG. 16, a shortened transmission process may be performed to increase the efficiency of multi-user uplink data transmission.

In a non-legacy system, the AP may use M-BA to transmit downlink ACKs for a plurality of STAs at one time. The M-BA may be set to a variable length, and there is no limit to the number of ACKs that can be processed at one time. Therefore, according to the embodiment of the present invention, when the consecutive multi-user uplink data transmissions are performed, an aggregated M-BA (AM-BA) including downlink ACKs for all STAs participating in uplink data transmission in the corresponding process can be used. The AP transmits the AM-BA at the end of the consecutive multi-user uplink data transmissions process.

Referring to FIG. 16, when additional UL-DATA transmission is performed after the first UL-DATA transmission is completed, the AP transmits an additional TF without transmitting the M-BA to induce a subsequent UL-DATA transmission. The first TF or every TF transmitted by the AP may include an indicator indicating that AM-BA is activated. The indicator is represented by a predetermined field of a preamble or MAC header of the TF.

When the AM-BA is activated, STAs that transmitted UL-DATA wait for reception of the next AM-BA without waiting for reception of M-BA if additional TF is received immediately after the UL-DATA transmission. The reception time information of the AM-BA may be obtained based on a duration field value of the TF. Meanwhile, the indicator indicating that the AM-BA is activated may be replaced with the aforementioned predetermined field indicating the presence or absence of an additional TF. That is, if the predetermined field indicates that an additional TF is present, the STAs that transmitted UL-DATA may switch to the doze state until the reception time of the AM-BA without waiting for the reception of the M-BA. Meanwhile, the operation of the terminals in the situation where the first set NAV remains after the additional UL-DATA transmission is completed is as described in FIG. 15.

Figure 17:
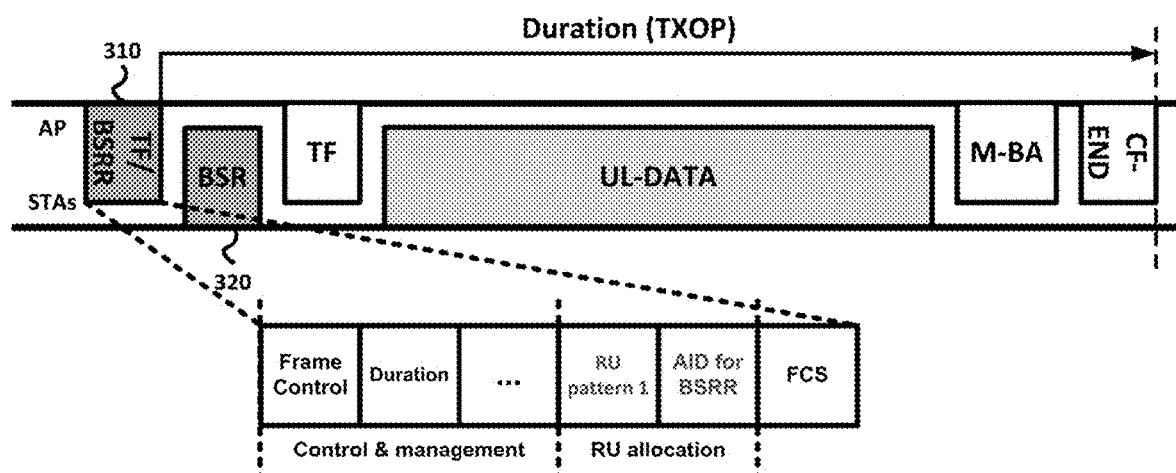
FIG. 17 illustrates a buffer status report and a multi-user uplink data transmission method according to an embodiment of the present invention.

FIG. 17 illustrates a buffer status report and a multi-user uplink data transmission method according to an embodiment of the present invention.

As described above, to increase the spectral efficiency of multi-user uplink data transmission, the transmissions of the contention trigger frame 310 and the request frame 320 may be performed in advance. According to an embodiment of the present invention, the contention trigger frame 310 may be a buffer status report request (BSRR) frame, and the request frame 320 may be a buffer status report (BSR) frame in response thereto. Since STAs can simultaneously transmit BSRs through a multiple access in the frequency domain, the transmission process of the BSRR and BSR may be regarded as a multi-user uplink transmission process.

If a resource unit allocation pattern is designated in advance, the AP may indicate a resource unit pattern number and a specific AID value designated for BSRR in the contention trigger frame 310 to indicate that a resource unit for the BSR is allocated. Therefore, the STA having uplink data to be transmitted among the non-legacy STAs receiving the BSRR randomly selects one of the resource units allocated for the BSR and transmits the BSR. The AP that has received the BSR allocates resource units based on the obtained buffer status information and transmits a TF for starting transmission of the UL-DATA. STAs transmitting BSR do not wait for M-BA for BSR but transmit UL-DATA in response to the TF.

Figure 18:
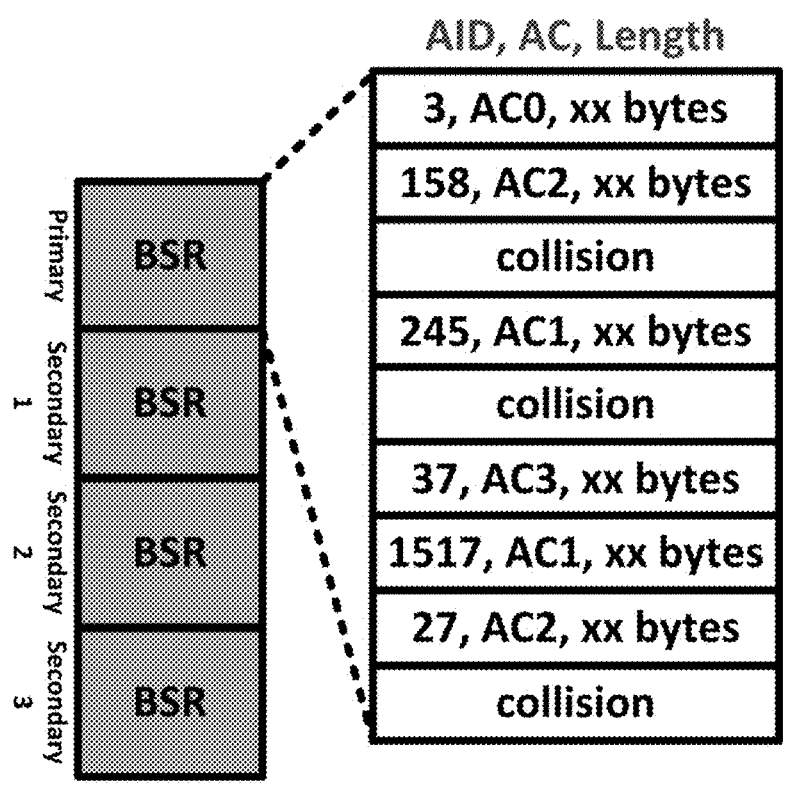
FIG. 18 illustrates a structure of a buffer status report according to an embodiment of the present invention.

FIG. 18 illustrates a structure of a buffer status report according to an embodiment of the present invention. According to the embodiment of the present invention, the buffer status report transmitted by the STA includes at least one of the identifier information of the STA, the size (i.e., Length) information of the data to be transmitted by the STA, and the access category (AC) information of the data to be transmitted by the STA. The identifier information of the STA indicates any one of the AID, the partial AID, or the MAC address of the STA.

In the embodiment of FIG. 18, the AP allocates resource units for BSR transmission in a total of four channels (primary channel, secondary channel 1, secondary channel 2, secondary channel 3) in units of 20 MHz. In this case, resource units for BSR transmission may be allocated in units of subchannels further subdivided in the 20 MHz channel. In FIG. 18, each allocated resource unit represents a random access-based resource unit. STAs having uplink data to be transmitted select any resource unit among the allocated resource units and transmit a BSR composed of the above information.

If a plurality of STAs select the same resource unit and transmit a BSR, a collision occurs and the AP cannot normally receive the BSR through the corresponding resource unit. The AP allocates a resource unit for uplink data transmission and transmits the trigger frame based on the BSR in which collision has not occurred. According to an embodiment, when the STA has uplink data for a plurality of independent traffic, the STA can perform random access independently for each traffic.

Figure 19:
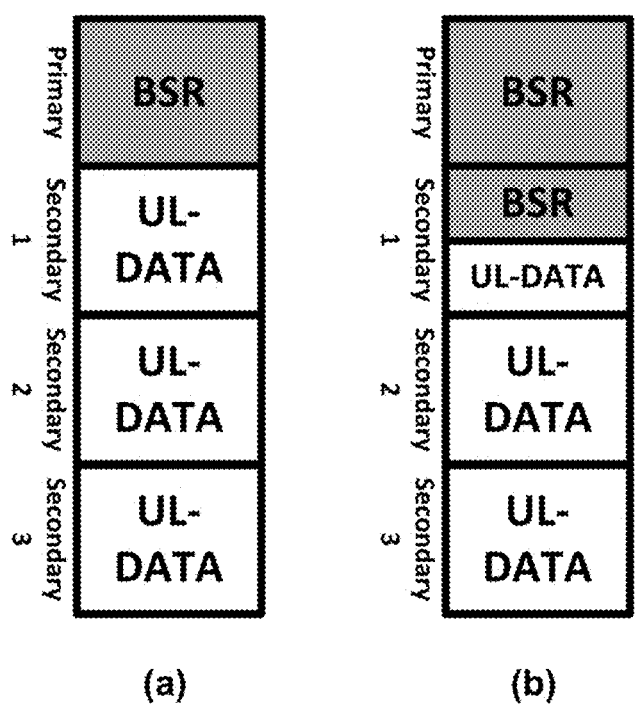
FIG. 19 illustrates a structure of a buffer status report according to another embodiment of the present invention.

FIG. 19 illustrates a structure of a buffer status report according to another embodiment of the present invention. According to the embodiment of FIG. 19, the buffer status report may be transmitted together with the uplink data.

The AP may limit the number of resource units for the BSR among all the reserved channels. According to the embodiment of the present invention, as shown in FIG. 19(a), the BSR may be transmitted only through some channels on a 20 MHz channel basis. According to another embodiment, as shown in FIG. 19(b), the BSR may be transmitted through some subchannels on a resource unit basis. Therefore, some of the resource units of the UL-OFDMA may be configured with BSRs, and the remaining resource units may be configured with multi-user uplink data. In this way, when the BSR and the uplink data are mixed, the AP may individually indicate the AID value for each resource unit when transmitting the BSRR in advance.

According to a further embodiment of the present invention, the BSR may be transmitted together in the uplink data transmission process of the STA. That is, some channels or subchannels may be used to transmit the BSR of the corresponding STA during the uplink data transmission of the STA.

Multi-User Cascade Transmission

Figure 20:
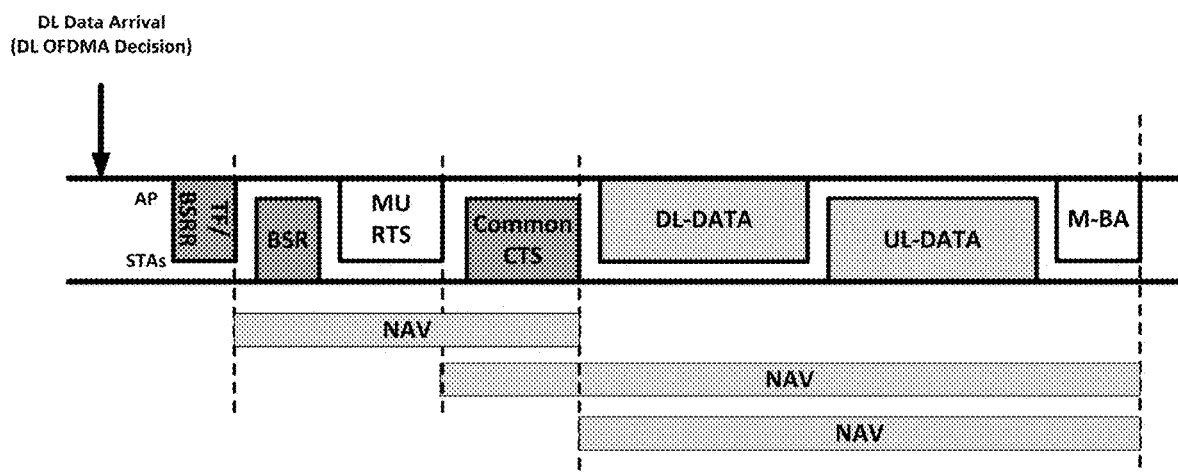
FIG. 20 illustrates a multi-user cascade transmission method according to an embodiment of the present invention.

FIG. 20 illustrates a multi-user cascade transmission method according to an embodiment of the present invention. In the embodiment of the present invention, the multi-user cascade transmission represents consecutive multi-user transmissions within the same TXOP. The multi-user cascade transmission includes transmission of multi-user downlink data (DL-DATA) and multi-user uplink data (UL-DATA) alternately. In other words, the cascade transmission includes alternately performing downlink OFDMA (DL-OFDMA) transmission and uplink OFDMA (UL-OFDMA) transmission.

When downlink data for downlink transmission occurs to the AP, the AP performs a backoff procedure to catch the transmission opportunity. When the backoff counter of the backoff procedure expires, the AP transmits the aforementioned buffer status report request (BSRR). The BSRR may be transmitted on a plurality of idle channels including the primary channel. The BSRR triggers a buffer status report (BSR) transmission of a plurality of STAs.

The STAs having the uplink data to be transmitted among the non-legacy STAs that have received the BSRR, transmit the BSR. As described above, the BSR includes at least one of the identifier information of the STA, the size information of the data to be transmitted by the STA, and the access category information of the data to be transmitted by the STA. The STAs transmit the BSR by randomly selecting any resource unit among the resource units of the channels through which the AP has transmitted the BSRR. BSRs transmitted by the STAs are used as information for resource unit allocation of multi-user uplink data transmission in the cascade transmission.

The AP allocates resource units for the cascade transmission based on the buffer information of the corresponding terminal and the transmitted BSR information. The AP transmits a multi-user RTS (MU-RTS) a SIFS time after the BSR is transmitted. The AP may set NAVs for the STAs not participating in the transmission during the TXOP period in which the cascade transmission is performed, by transmitting the MU-RTS. The MU-RTS may be transmitted after the scheduling for the cascade transmission is completed, and a duration field of the MU-RTS is set to the total duration information of the cascade transmission based on the scheduling. The AP may also indicate STAs to participate in the cascade transmission via the MU-RTS. The transmitter address of the MU-RTS may be set to the MAC address of the AP, and the receiver address of the MU-RTS may be set to a predefined multicast address or broadcast MAC address for the MU-RTS. According to another embodiment of the present invention, the receiver address field of the MU-RTS may be omitted. The MU-RTS includes identifier information of STAs participating in the cascade transmission. According to an embodiment, the identifier information of each of a plurality of STAs or a predetermined group identifier may be inserted into a payload of the MU-RTS.

The STAs specified in the MU-RTS receive the MU-RTS and transmit CTS after a SIFS time. A plurality of STAs simultaneously transmit CTS (e.g., Common CTS) set in the same waveform. That is, the CTSs simultaneously transmitted by a plurality of STAs are generated based on the same content, a modulation and coding scheme (MCS), and a scrambling seed. The duration field of the CTS is set based on the duration field of the MU-RTS and is set to the period until the end of the cascade transmission. A STA not participating in the cascade transmission receives CTSs transmitted by a plurality of STAs and sets a NAV based on the duration field information of the corresponding CTSs.

The AP transmits multi-user downlink data (DL-DATA) by using DL-OFDMA SIFS time after the CTS is transmitted. The plurality of STAs transmit the multi-user uplink data (UL-DATA) by using UL-OFDMA the SIFS time after the transmission of the DL-DATA is completed. According to an embodiment of the present invention, the DL-DATA transmitted by the AP may include at least one trigger frame for triggering uplink transmission of a plurality of STAs. For example, the AP may transmit a trigger frame for triggering the UL-DATA transmission of multiple STAs through at least some resource units of the DL-DATA. In addition, the AP may transmit a trigger frame for triggering uplink ACK (UL-ACK) transmission of STAs in response to the DL-DATA through at least some resource units of the DL-DATA. The trigger frame is transmitted by using DL-OFDMA along with the DL-DATA. A plurality of STAs receiving the trigger frame together with the DL-DATA transmits the corresponding frame, i.e. UL-DATA and/or UL-ACK by using UL-OFDMA.

When the multi-user downlink data (DL-DATA) transmission is completed, a multi-user uplink data (UL-DATA) transmission is performed after a predetermined IFS time. STAs allocated resource units through the trigger frame transmitted together with the DL-DATA transmit UL-DATA and/or UL-ACK through the corresponding resource unit. After transmitting the UL-ACK, a STA allocated to transmit the additional UL-DATA can transmit the UL-ACK by piggybacking it to the UL-DATA. If DL-DATA is subsequently transmitted after the UL-DATA, the UL-DATA may include at least one trigger frame for triggering downlink transmission of the AP. That is, the STAs may transmit a trigger frame for triggering the DL-DATA transmission of the AP through at least some resource units of the UL-DATA. In addition, the STAs may transmit a trigger frame for triggering the downlink ACK (DL-ACK) transmission of the AP in response to the UL-DATA through at least some resource units of the UL-DATA.

When the downlink data (DL-DATA) transmission and the uplink data (UL-DATA) transmission are all completed, the AP transmits an M-BA to terminate the cascade transmission. According to an embodiment of the present invention, NAV setting is possible through the BSRR, MU-RTS and CTS. The actual transmission length of the cascade transmission may vary depending on the resource allocation and scheduling results. Therefore, a duration field value of the BSRR may be set to a period of time up to the transmission time of the CTS. However, when the BSR transmissions of the STAs are completed, the actual transmission length of the cascade transmission is determined. Therefore, duration fields of the MU-RTS and the CTS are set to a period until all the processes of the cascade transmission are completed.

Figure 21:
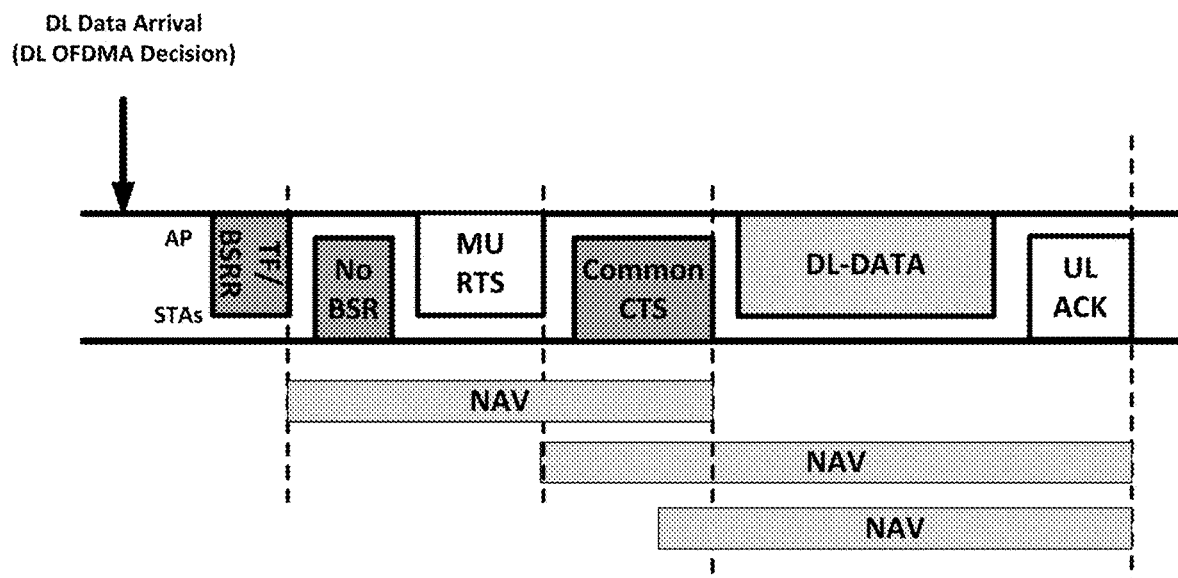
FIG. 21 illustrates a multi-user cascade transmission method according to another embodiment of the present invention.

FIG. 21 illustrates a multi-user cascade transmission method according to another embodiment of the present invention. In the embodiment of FIG. 21, the same or corresponding parts as those of the above-described embodiment of FIG. 20 will be omitted.

According to an embodiment of the present invention, the cascade transmission may be initiated when the AP has downlink data to be transmitted. However, even if the AP has the downlink data, there may be no STA having uplink data to be transmitted to the AP. In this case, the response BSR for the BSRR transmitted by the AP may not be transmitted. According to the embodiment of the present invention, when the BSR corresponding to the BSRR is not received, the cascade transmission may be configured with only the multi-user downlink data (DL-DATA) transmission of the AP. Therefore, the AP only performs DL-DATA transmission and does not perform uplink transmission triggering.

Figure 22:
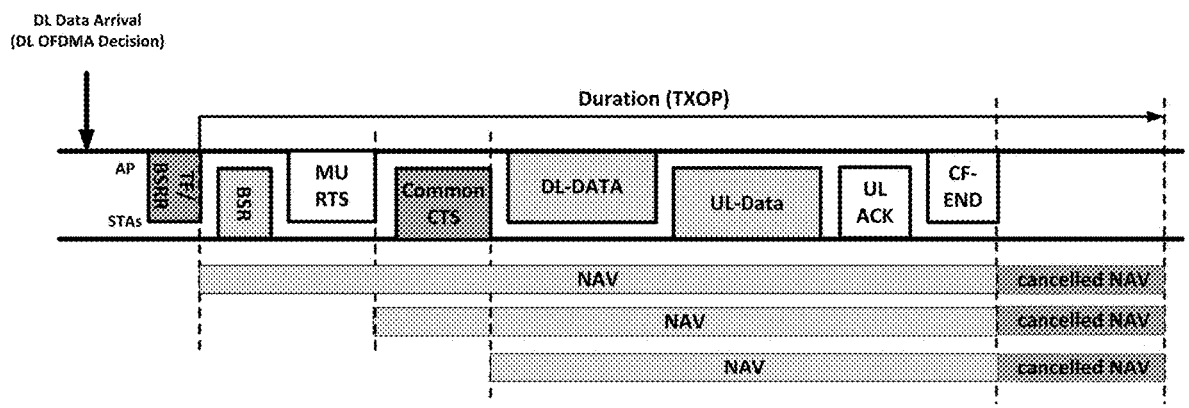
FIG. 22 illustrates a NAV cancellation process according to another embodiment of the present invention.

FIG. 22 illustrates a NAV cancellation process according to another embodiment of the present invention.

In the embodiments of the FIGS. 20 and 21, it is assumed that the cascade transmission is scheduled based on the downlink data information of the AP and the uplink data information of the BSR. However, different scheduling methods may be needed depending on the implementation method of the BSR and the fluidity of the buffer status of each STA. According to the embodiment of FIG. 22, the AP may reserve the maximum available TXOP length with the BSRR, and then adjust the termination time of the cascade transmission process according to the situation. Therefore, if the cascade transmission is completed and the previously reserved TXOP remains, the AP may transmit a CF-END to return the NAV. According to another embodiment, the AP and all the STAs participating in the cascade transmission may transmit a CF-END of the same waveform to return the NAV.

Although the present invention is described by using the wireless LAN communication as an example, the present invention is not limited thereto and the present invention may be similarly applied even to other communication systems such as cellular communication, and the like. Further, the method, the apparatus, and the system of the present invention are described in association with the specific embodiments, but some or all of the components and operations of the present invention may be implemented by using a computer system having universal hardware architecture.

The detailed described embodiments of the present invention may be implemented by various means. For example, the embodiments of the present invention may be implemented by a hardware, a firmware, a software, or a combination thereof.

In case of the hardware implementation, the method according to the embodiments of the present invention may be implemented by one or more of Application Specific Integrated Circuits (ASICSs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and the like.

In case of the firmware implementation or the software implementation, the method according to the embodiments of the present invention may be implemented by a module, a procedure, a function, or the like which performs the operations described above. Software codes may be stored in a memory and operated by a processor. The processor may be equipped with the memory internally or externally and the memory may exchange data with the processor by various publicly known means.

The description of the present invention is used for exemplification and those skilled in the art will be able to understand that the present invention can be easily modified to other detailed forms without changing the technical idea or an essential feature thereof. Thus, it is to be appreciated that the embodiments described above are intended to be illustrative in every sense, and not restrictive. For example, each component described as a single type may be implemented to be distributed and similarly, components described to be distributed may also be implemented in an associated form.

The scope of the present invention is represented by the claims to be described below rather than the detailed description, and it is to be interpreted that the meaning and scope of the claims and all the changes or modified forms derived from the equivalents thereof come within the scope of the present invention.

MODE FOR INVENTION

As above, related features have been described in the best mode.

INDUSTRIAL APPLICABILITY

Various exemplary embodiments of the present invention have been described with reference to an IEEE 802.11 system, but the present invention is not limited thereto and the present invention can be applied to various types of mobile communication apparatus, mobile communication system, and the like.

The invention claimed is:

1. A wireless communication terminal, comprising:
a transceiver; and
a processor,
wherein the processor is configured to:
receive, through the transceiver, a trigger frame including a specific field,
wherein the specific field indicates whether transmission of a next trigger frame soliciting uplink transmission to one or more terminals is scheduled after transmission of the trigger frame and is used to determine a state of the wireless communication terminal,
wherein the next trigger frame is transmitted within a same service period (SP) as a service period in which the trigger frame is transmitted when the specific field is set to a value indicating transmission of the next trigger frame, and
perform a multi-user uplink transmission in response to the trigger frame.

2. The wireless communication terminal of claim 1,
wherein a backoff counter for a random access based multi-user uplink transmission is decremented by a maximum of N in response to the trigger frame when the trigger frame allocates one or more N resource unit(s) for the random access based multi-user uplink transmission.

3. The wireless communication terminal of claim 1,
wherein the random access based multi-user uplink transmission is performed in response to the trigger frame by the one or more terminals of which the backoff counter is decremented to 0.

4. The wireless communication terminal of claim 1,
wherein an awake state of the wireless communication terminal is maintained when the specific field indicates that the next trigger frame follows the trigger frame during the same service period, and
wherein the state of the wireless communication terminal is switched to a doze state when the specific field indicates that the next trigger frame does not follow the trigger frame during the same service period.

5. The wireless communication terminal of claim 1,
wherein the processor is further configured to:
receive the next trigger frame requesting a buffer status information of the wireless communication terminal, and
transmit the buffer status information of the wireless communication terminal in response to the next trigger frame.

6. The wireless communication terminal of claim 5,
wherein the buffer status information of the wireless communication terminal includes at least one of identifier information of the wireless communication terminal, size information of data to be transmitted by the wireless communication terminal, and/or access category information of data to be transmitted by the wireless communication terminal.

7. A wireless communication method of a wireless communication terminal, the method comprising:
receiving, through the transceiver, a trigger frame including a specific field,
wherein the specific field indicates whether transmission of a next trigger frame soliciting uplink transmission to one or more terminals is scheduled after transmission of the trigger frame and is used to determine a state of the wireless communication terminal,
wherein the next trigger frame is transmitted within a same service period (SP) as a service period in which the trigger frame is transmitted when the specific field is set to a value indicating transmission of the next trigger frame; and
performing a multi-user uplink transmission in response to the trigger frame.

8. The wireless communication method of claim 7,
wherein a backoff counter for a random access based multi-user uplink transmission is decremented by a maximum of N in response to the trigger frame when the trigger frame allocates one or more N resource unit(s) for the random access based multi-user uplink transmission.

9. The wireless communication method of claim 7,
wherein the random access based multi-user uplink transmission is performed in response to the trigger frame by the one or more terminals of which the backoff counter is decremented to 0.

10. The wireless communication method of claim 7,
wherein an awake state of the wireless communication terminal is maintained when the specific field indicates that the next trigger frame follows the trigger frame during the same service period, and
wherein the state of the wireless communication terminal is switched to a doze state when the specific field indicates that the next trigger frame does follow the trigger frame during the same service period.

11. The wireless communication method of claim 7, the method further comprising:
receiving the next trigger frame requesting a buffer status information of the wireless communication terminal; and
transmitting the buffer status information of the wireless communication terminal in response to the next trigger frame.

12. The wireless communication method of claim 11,
wherein the buffer status information of the wireless communication terminal includes at least one of identifier information of the wireless communication terminal, size information of data to be transmitted by the wireless communication terminal, and/or access category information of data to be transmitted by the wireless communication terminal.

* * * * *